United States Patent [19]

Shimada et al.

[11] Patent Number: 5,448,696
[45] Date of Patent: Sep. 5, 1995

[54] MAP INFORMATION SYSTEM CAPABLE OF DISPLAYING LAYOUT INFORMATION

[75] Inventors: Shigeru Shimada, Kodaira; Fumio Kawamura, Fujisawa; Kazuyuki Suzuki, Toride; Nobuyuki Chikada, Tama; Shirou Takei, Konosu, all of Japan

[73] Assignees: Hitachi, Ltd.; The Tokyo Electric Power Co., Inc., both of Tokyo, Japan

[21] Appl. No.: 173,469

[22] Filed: Dec. 27, 1993

Related U.S. Application Data

[63] Continuation of Ser. No. 800,244, Nov. 29, 1991, abandoned.

[30] Foreign Application Priority Data

Nov. 30, 1990 [JP] Japan .................................. 2-329105
Nov. 30, 1990 [JP] Japan .................................. 2-329107

[51] Int. Cl.$^6$ ............................................. G06T 11/60
[52] U.S. Cl. ..................................... 395/161; 395/160; 395/127
[58] Field of Search ................. 395/129, 147, 155–161, 395/121, 120, 119; 340/990, 995

[56] References Cited

U.S. PATENT DOCUMENTS

| | | | |
|---|---|---|---|
| 4,601,003 | 7/1986 | Yoneyama et al. | 395/159 |
| 4,642,790 | 2/1987 | Minshull et al. | 395/158 |
| 4,821,212 | 4/1989 | Heartz | 395/126 |
| 4,899,292 | 2/1990 | Montagna et al. | 395/147 |
| 4,970,664 | 11/1990 | Kaiser et al. | 395/160 |
| 4,972,319 | 11/1990 | Delorme | 364/419 |
| 5,129,052 | 7/1992 | Barker et al. | 395/148 |
| 5,309,550 | 5/1994 | Takahashi | 395/121 |

OTHER PUBLICATIONS

"Principles of Database Systems", by Ullman, J. D., Computer Science Press, Potomac, Mayland, 1980.
"Multi-media Map Information System for Electric Power Facilities Using Automatic Selective Recognition Method", by Chikada, Shimada, Miyatake and Matsushima, the national meeting of the Institute of Electronics Information and Communication Engineers of Japan, FY 1988, SD-7-4.

Primary Examiner—Heather R. Herndon
Assistant Examiner—Michael Smith
Attorney, Agent, or Firm—Antonelli, Terry, Stout & Kraus

[57] ABSTRACT

A method for displaying information and system includes the steps of displacing map data on the screen of a display unit, displaying layout data representing one or more segments of a certain floor in each of the one or more structure elements of the map data displayed on a first designated portion, on a second designated portion of the screen in response to a layout display instruction, and displaying attribute data corresponding to each of the one or more segments of the floor.

17 Claims, 29 Drawing Sheets

FIG. 4

| RESIDENCE ID | RESIDENCE NUMBER | FLOOR NUMBER | NAME OF OWNER | TELEPHONE NUMBER | CONTRACT CAPACITY |
|---|---|---|---|---|---|
| 632465 | ABC102 | 1 | K. MIYAMOTO | 123-4567 | 10 |
| 721172 | ABC104 | 1 | H. YAMADA | 891-2343 | 10 |
| 363724 | ABC201 | 2 | S. IMAMURA | 678-9123 | 30 |
| 562354 | ABC204 | 2 | S. INOUE | 456-7891 | 10 |
| 124376 | ABC205 | 2 | Y. NAKANO | 234-5678 | 10 |
| 635422 | ABC206 | 2 | S. KOTOH | 912-3456 | 30 |
| - - - | ABC301 | 3 | H. OHNISHI | 789-1234 | 10 |
| ⋮ | ⋮ | ⋮ | ⋮ | ⋮ | ⋮ |

FIG. 11A

FIGURE PORTION

| | |
|---|---|
| FIGURE TABLE HEADER (LRT001) | |
| CONSTITUENT ITEMS OF 1st RECORD (ADL001) | $N_1$ |
| TYPE OF LINE | $KL_1$ |
| STARTING POINT INFORMATION | $SI_1$ |
| ENDING POINT INFORMATION | $EI_1$ |
| STARTING POINT X COORDINATER | $X_1$ |
| Y COORDINATER | $Y_1$ |
| ⋮ | |
| BENDING POINT X COORDINATER | $X_M$ |
| Y COORDINATER | $Y_M$ |
| ⋮ | |
| ENDING POINT X COORDINATER | $XN_1$ |
| Y COORDINATER | $YN_1$ |
| CONSTITUENT ITEMS OF 2nd RECORD (ADL002) | $N_2$ |
| TYPE OF LINE | $K_2$ |
| | $SI_2$ |
| | $EI_2$ |

FIG. 11B

TEXT PORTION

| | |
|---|---|
| TEXT TABLE HEADER (TRT001) | |
| NUMBER OF TEXTS OF 1st RECORD (ADT001) | $M_1$ |
| TYPE OF LINE | $KT_1$ |
| WIDTH OF LETTER | $W_1$ |
| HEIGHT OF LETTER | $H_1$ |
| SLOPE ANGLE | $V_1$ |
| ROTATION ANGLE | $R_1$ |
| DEVELOPMENT DIRECTION FLAG | $F_1$ |
| REFERENCE POINT X COORDINATER | $X_1$ |
| Y COORDINATER | $Y_1$ |
| TEXT CODE 1 | $TC1$ |
| TEXT CODE 2 | $TC2$ |
| ⋮ | |
| TEXT CODE $M_1$ | $TCM_1$ |
| NUMBER OF TEXTS OF 2nd RECORD (ADT002) | $M_2$ |
| TYPE OF LINE | $KT_2$ |
| WIDTH OF LETTER | |

F I G. 12

| RESIDENT ID | RESIDENT NUMBER | NUMBER OF FLOURE | NAME OF OWNER | TELEPHONE NUMBER | HOUSE LAYOUT |
|---|---|---|---|---|---|
| 632465 | AB102 | 1 | M. TANAKA | 263-1145 | 3DK |
| 721177 | AB104 | 1 | S. KIKUCHI | 211-2245 | 3LDK |
| 363724 | AB201 | 2 | T. YAMADA | 331-1123 | 4DK |
| 562354 | AB204 | 2 | T. YAMANAKA | 262-2254 | 2LDK |
| 124376 | AB205 | 2 | S. INOUE | 731-7511 | 3LDK |
| 635422 | AB206 | 2 | M. KATO | 112-2589 | 4DK |
| 321157 | AB301 | 3 | H. OHNISHI | 263-3311 | 4LDK |
| 226172 | AB306 | 3 | Y. NAKANO | 264-5112 | 3DK |

FIG. 15

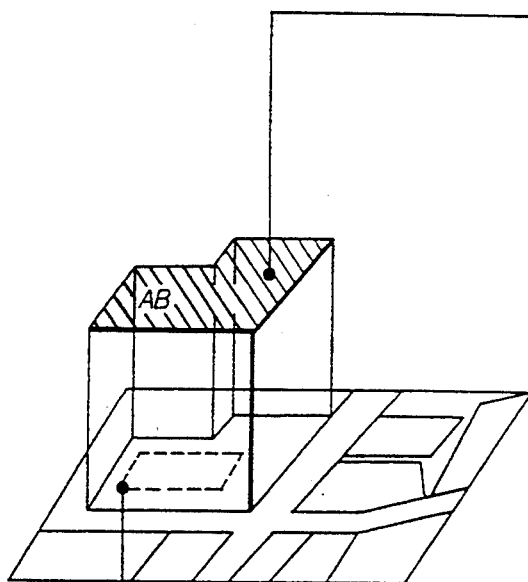

```
( PH3L )
Definitions
= Polygon 3D : Figure
  Point            // TOTAL NUMBER
                      OF POINTS
  *xyz data        // WORLD
                      COORDINATE
                      POINT DATA
  inptr            //

Methods
 + new             // INSTANCE
                      GENERATION
 - a Point         // DATA SETTING
 - display         // THREE-
                      DIMENSIONAL
                      DISPLAY
   {dispPolyLine3(*xyzdata)}
```

```
( PH3T )
Definitions
= Text : Figure
  textX, textY, textZ  // REFERENCE
                          COORDINATES
  *moji            // TEXT CODE
  height, width    // LETTER HEIGHT
                      AND WIDTH Methods
 + new             // GENERATION OF
                      INSTANCE LETTERS
 - initialize      // SETTING OF
                      LETTER DATA
 - display         // DISPLAY OF TWO-
                      DIMENSIONAL
                      LETTERS
   {dispText3(*moji)}
```

"DESIGNATE THE HOUSE FRAME OF THE "AB MANSION" ON THE MAP

RETRIEVE 2F PORTION OF THE "AB MANSION"

RETRIEVE B1 PORTION OF THE "AB MANSION"

LAYOUT OF GROUND SURFACE

LAYOUT OF UNDERGROUND B1

LAYOUT OF UNDERGROUND B2

(a) LAYOUT OF GROUND SURFACE (b) LAYOUT MASK DATA AND LAYOUT DATA OF UNDERGROUND B1

(c) LAYOUT MASK DATA AND LAYOUT DATA OF UNDERGROUND B2

F I G. 30
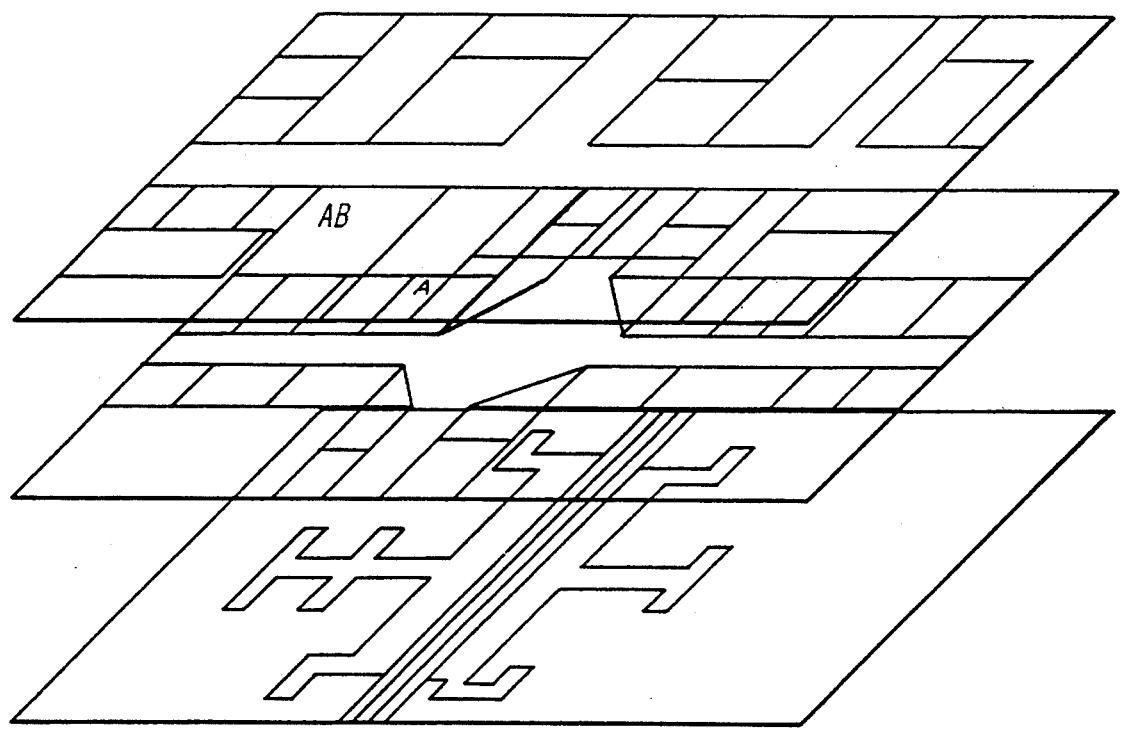

MAP INFORMATION SYSTEM CAPABLE OF DISPLAYING LAYOUT INFORMATION

This application is a continuation of Ser. No. 07/800,244, filed Nov. 29, 1991, now abandoned.

BACKGROUND OF THE INVENTION

The present invention relates to a method of display layout data and a system therefore.

The following references have been known relating to the present invention. These references are suitably cited in the following explanation of the present invention.

Reference 1: "Map Information Expert System GENTLE", by Shimada and Ejiri, a preparatory draft for the Advanced Database System Symposium in 1985, pp 93-101, Information Processing Society of Japan;

Reference 2: "Introduction to Three-Dimensional Graphics based on C Language", by Shigeo Ishii, Gijutsu Hyoronsha, 1985;

Reference 3: "Principles of Database Systems", by Ullman, J. D., Computer Science Press, Potomac, Mayland, 1980;

Reference 4: "Object-oriented Programming: An Evolutionary Approach", by Brad J. Cox, Addison-Wesley Cop. Inc., 1988;

Reference 5: "A multiple prospector and an Automatic Message Propagation Mechanism for Multi-media type Map-based Systems", by Shimade, et. al., Proc. Advanced Database System Symposium, 1989;

Reference 6: "Multi-media Map Information System for Electric Power facilities using Automatic Selective Recognition Method", by Chikada, Shimada, Miyatake and Matsushima, the national meeting of The Institute of Electronics Information and Communication Engineers of Japan, 1988, SD-7-4; and Reference 7: "Application of Map Information—for forming regional appearance" by, Goji Sasada, Graphic Processing Information Center, 1983.

As one of relevant patent applications, there is the U.S. Pat. application Ser. No. 07/630,328, now U.S. Pat. No. 5,210,868 dated May 11, 1993 titled "Method of Processing Multimedia Data in Multimedia Database and System Therefor" filed on Nov. 29, 1990. One of the inventors of this relevant application (Mr. Shimada) is also one of the inventors of the present application.

Another relevant U.S. Pat. application Ser. No. 07/789,005, now pending, titled "Method of Three-dimensional Display of Object-oriented Figure Information and System Therefor" was filed on Nov. 7, 1991, based on the Japanese patent application No. Hei-2-299718 filed on Nov. 7, 1990. The two inventors (Shimada and Kawamura) of this relevant application are also two of the inventors of the present application.

Still another relevant U.S. Pat. application Ser. No. 07/799,998, now pending, titled "Method of Managing Information and System Therefore" was filed on Nov. 29, 1991, based on the Japanese patent application No. Hei-2-329106 was filed on Nov. 30, 1990. The two inventors (Shimada and Chikada) of this relevant application are also two of the inventors of the present application. The relevant patent applications are incorporated herein by reference.

In recent years, multistory buildings and underground markets have been developed in the centers of areas. In order to identify details of buildings and houses or the arrangement and location of shops and stores, three-dimensional information, such as the numbers of floors of buildings and the numbers of floors of underground markets has been employed in addition to conventional two-dimensional information such as provided on typical maps. Under such a situation, in each of public enterprises and architectural and civil engineering enterprises, three-dimensional map displays, which take account of heights of buildings as well as figures of the buildings above the ground surface level, have come to be required because the conventional two-dimensional map displays are not sufficient in performing works, such as facility inspections and urban designs for which maps are used.

In order to meet these requirements, various kinds of three-dimensional bird's-eye displays using design data have already been carried out in the field of an architectural CAD, as shown in the reference 7. In the architectural CAD, data of buildings and the like are converted into complete three-dimensional data and stored in a data base. By using this data the buildings and highways can be displayed in a three-dimensional manner when they are to be viewed from any desired direction.

Therefore, a method would be considered wherein various attribute data of the buildings having three-dimensional characteristics are displayed in one-to-one corresponding relation with the buildings, after the three-dimensional bird's-eye display is made.

Further, a method of applying shading to the display considering a light source has been proposed recently, in addition to a mere three-dimensional display using a wire frame, so that a display having more reality has gradually been made possible.

However, in application of the method shown in the above reference 7 to a map information system as an example of a figure information system, it is necessary to obtain figure data of a building as data of a complete three-dimensional coordinate system (x, y, z) as in the architectural and civil engineering CAD. Therefore, the following four problems exist.

As the first problem, in the case of a map information system, there is a heavy load for displaying various kinds of attribute information in correspondence with figure elements on a two-dimensional display of map data which include a large amount of figure elements such as roads and house frames. Therefore it is not practical for a complete three-dimensional display of the map data compared with the architectural CAD system. In other words, it is assumed that the map data is merely stored in a data base which map data includes coordinate data indicative of figure elements of roads and buildings, and symbols for churches, banks, and the like, and texts for display. Therefore, in the case of retrieving attribute data by using a displayed building or text as a key for the retrieval, a z-coordinate of a height direction needs to be searched for route search processing and search processing within a near range in addition to two-dimensional coordinates (x, y). Therefore, the time for executing various retrieval processings is expected to become extremely long.

As a second problem, in a map information system, in order to obtain complete detailed data of three-dimensional coordinates for buildings as defined in the architectural CAD system, it is necessary to obtain such detailed data by searching data associated with each building, resulting in an enormous amount of search processes. Therefore, it is almost impossible to completely build a three-dimensional data base for this purpose.

As a third problem, when map data for a wide three-dimensional area, such as an underground market, is to be displayed, displays of houses and tenants on each floor tend to interfere with each other in many cases, as shown in FIG. 30, resulting in a very complicated display which is difficult to understand. Therefore, a detailed instruction cannot be made such that a part of the result of the display cannot be processed by designating this part by means of a mouse.

As a fourth problem, in the case of displaying various kinds of attribute data on the above three-dimensional display, it is expected to be extremely difficult to confirm at a later stage a corresponding relation between buildings and an attribute.

SUMMARY OF THE INVENTION

The present invention has been made in the light of the above-described situations, and it is an object of the present invention to provide a method for displaying attribute data having three-dimensional characteristics on a two-dimensional display of map information in one-to-one correspondence, and a system therefor.

It is another object of the present invention to provide a method for displaying layout information such as an underground shop street layout diagram and a tenant residence diagram which exist separately from map information, and a system therefor.

In order to achieve the above objects, the method for displaying layout information in a map information system, includes the steps of:

displaying map data on the screen of a display unit in response to a map display instruction, each of one or more constituent elements of the map data displayed on a first designated portion of the screen including one or more segments on each floor;

displaying, on a second designated portion of the screen, the layout data indicative of the one or more segments of a floor for each constituent element, in response to a layout display instruction; and displaying attribute data corresponding to each of the one or more segments of the floor.

As explained above, according to the attribute data display method of the present invention, the attribute data having three-dimensional characteristics can be displayed on two-dimensionally displayed map information in a one-to-one correspondence relation without any inconsistency. With this arrangement, not only the display speed is increased but also functional performance is improved substantially, so that the system provides substantial improvements to the using characteristics for the users.

Also, layout information such as an underground market layout diagram and a tenant residence diagram which exist separate from the map information can be displayed so that these diagrams can completely match with the map data. Further, attribute data having three-dimensional characteristics can also be displayed so that the attribute data matches with the layout information in a one-to-one correspondence relation. Therefore, the functional characteristics for the users to use the system can be improved substantially.

Furthermore, according to the present invention, attribute data having three-dimensional characteristics can be completely corresponded to the elements of a map displayed two-dimensionally, without any duplication, so that the retrieval or editing operation can be made completely, leading to a substantial improvement in the man-machine characteristics.

BRIEF DESCRIPTION OF THE DRAWINGS

FIG. 4 is a diagram showing one example of a format of an attribute data base having three dimensional characteristics;

FIGS. 11A and 11B are diagrams showing figure data and text data, stored in a map data base respectively;

FIG. 12 is a diagram showing attribute data;

FIG. 15 is a diagram showing a relation among a three-dimensional display of the map, the figure entity object and the text entity object;

FIG. 30 is a diagram for showing the state of displaying layout data relating to a wide underground shop street and a wide subway station, by simple superposing these layout data together.

DESCRIPTION OF THE PREFERRED EMBODIMENTS

The map information system capable of displaying layout data will be explained below with reference to the attached drawings.

The basic concept of the present invention will be explained first. According to the present invention, layout data such as a shop layout and a tenant residence layout which exist separate from map data is displayed in correspondence with figure elements of the map data already displayed, such that the layout data is completely superposed on the displayed figure elements by applying conversion processing of a data format to the layout data. By this processing, a complete one-to-one correspondence relation is obtained between these figure elements and attribute data having three-dimensional characteristics. Further, in the case of displaying the attribute data on the map data, it is possible to make a lateral display for each floor or a partially sectional display.

In the present invention, attribute data having three-dimensional attributes are rearranged on a two-dimensional partial list. Accordingly, by converting the map data into a two-dimensional virtual exploded diagram, it is possible to convert the map data into a development elevation having a virtual format so that the three-dimensional attribute data has a one-to-one correspondence relation with the map data and to display the converted development elevation.

Further, by fixing one axis of a three-dimensional display, a two-dimensional display can be made in the state that equivalent virtual slices are displayed for each floor.

Figure 1:
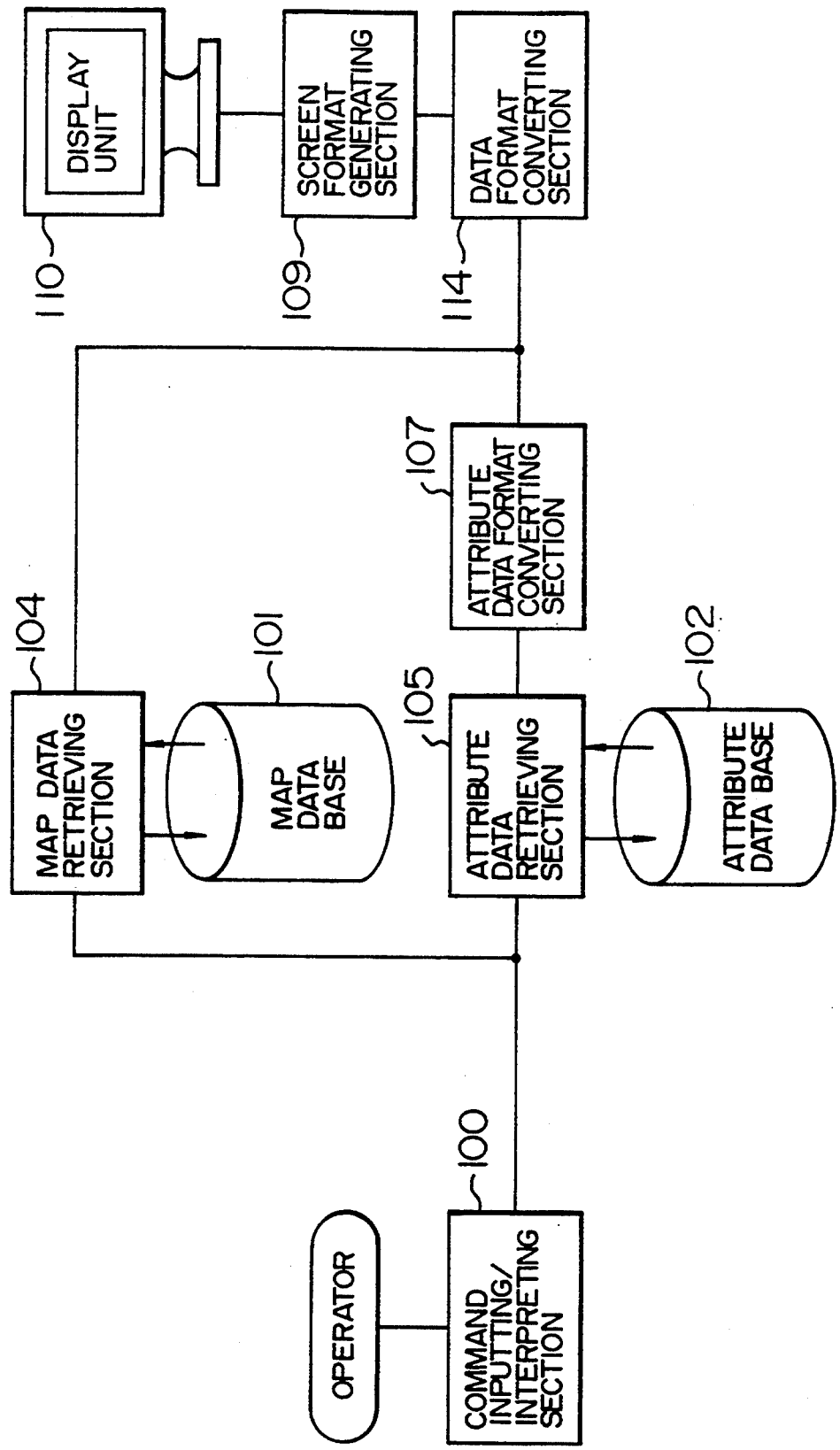
FIG. 1 is a block diagram showing the functional structure of the map information system according to a first embodiment of the present invention.

Next, the first embodiment of the present invention according to a map information system will be explained with reference to FIG. 1. FIG. 1 is a block diagram showing a functional structure of the map information system according to the first embodiment. The functional structure includes broadly four sections, including an operating section, a processing section, a data base section and a display section. The data base section is divided into a map data base 101 for storing map data and an attribute data base 102 for storing attribute data having three-dimensional characteristics, and each data base is stored in a file unit. When an operator inputs a retrieval key and an edit command from a command inputting/interpreting section 100, the map data of a corresponding area is retrieved from the map data base 101 by a map data retrieving section 104, and converted into display data by a data format converting section 114. Also, an attribute data retrieving section 105 retrieves three-dimensional attribute data having a correspondence relation with the retrieved map data from the attribute data base 102. An attribute data format converting section 107 converts the retrieved data into data having a list format. Also, the converting section 107 converts the retrieved attribute data into data which can be displayed two-dimensionally. A data format converting section 114 combines the map data prepared for display and attribute data, and a screen format generating section 109 generates display data which matches the screen of a display unit 110 such as a CRT which displays the display data on the screen.

Figure 2:
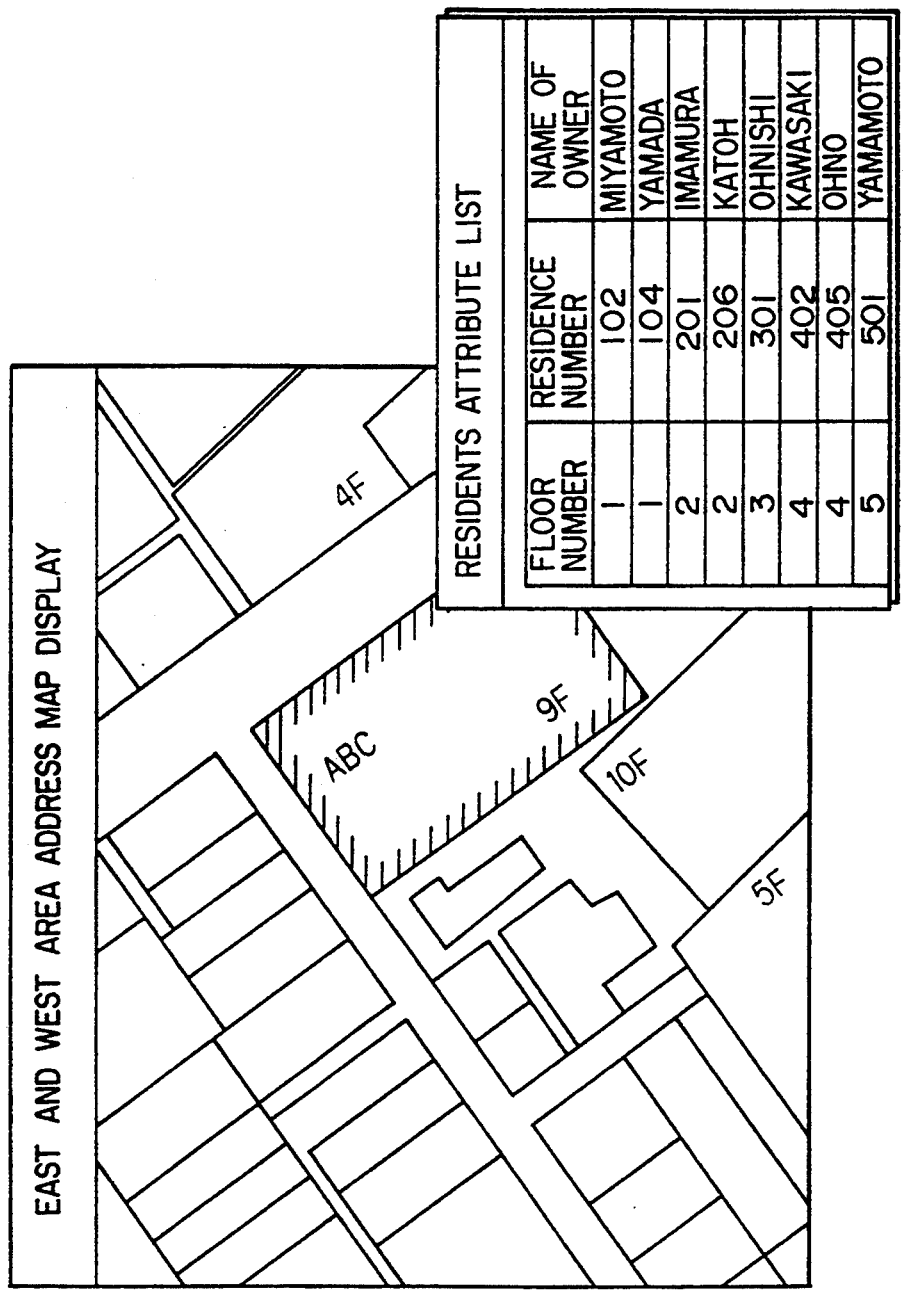
FIG. 2 is a diagram showing a method of displaying attribute data in a conventional map information system.

Next, description will be made of a method for retrieving attribute data having three-dimensional characteristics from the attribute data base 102 and for making the attribute data to have a correspondence relation with each of display elements of a two-dimensionally displayed map by the converting section 107 in the map information system. First, figure and image data for making a two-dimensional display of figures or a map are stored in the map data base 101 in advance. For example, plane map data as observed from above, such as a map of the East and West area shown in FIG. 2, is stored in the map data base. On the other hand, attributes relating to each owner in a vertical axis with attribute items such as number of floors, residence number, name of owner, address and other attributes of the owner in a horizontal axis are stored in the attribute data base 102 in a relational format, as shown in a residence attribute list in FIG. 2, for example. A method of displaying attribute data of residents in a building having three-dimensional characteristics, having one-to-one correspondence relation with the attribute data to figure elements of the map data without any inconsistency, can be broadly classified into the following two types:

① A case where a format of detailed figure elements having a correspondence relation between a layout diagram for each resident within a building and attribute data such as a tenant residence diagram for an underground street, can be known in advance, and ② A case where figure elements are not known at all.

Figure 3:
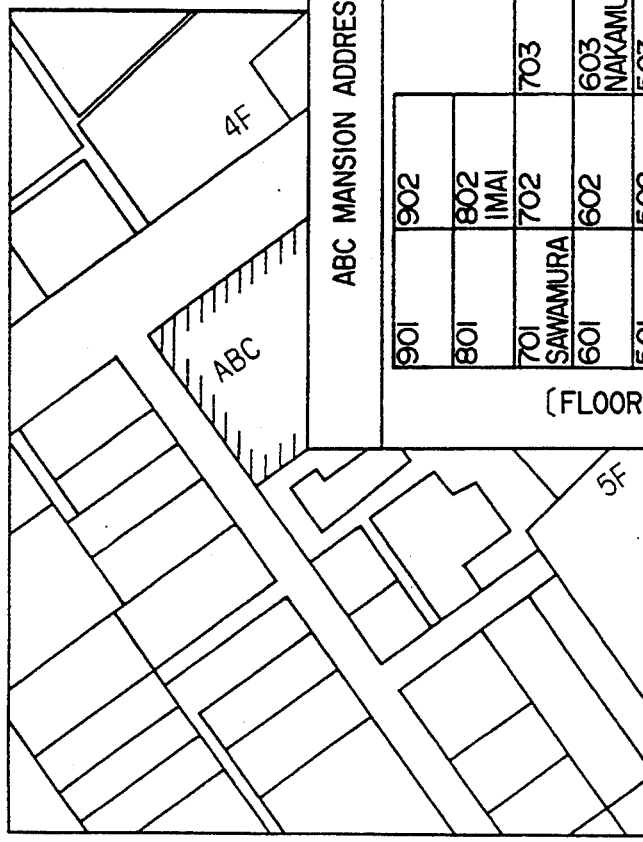
FIG. 3 is a diagram showing an example of the display of attribute data on a separate window based on the present invention.

In the case ①, it is generally almost impossible to understand a layout diagram for individual residents within a building and a state of tenant residence in the underground street. Therefore, in many cases, a detailed state cannot be obtained. Accordingly, in the present embodiment, description will be made of a method for displaying figure element which corresponds to attribute data as a virtual layout diagram for residents within a building, by using data obtained by checking the contents of an attribute data base, obtaining a maximum value of the number of residents for every floor in the building, and extracting a maximum of numbers of floors, based on the assumption of the above case ②. For example, as shown in FIG. 3, a virtual residence layout diagram of a nine-floor "ABC" apartment house is displayed on a lower window. In the window, numbers of floors are displayed vertically and maximum numbers of residents at different floors are displayed laterally to make correspondence between the vertical and horizontal axes. In the example of FIG. 3, names of residents together with residence numbers are displayed at corresponding positions of each layout diagram.

An outline flow for displaying the virtual residence layout diagram as a graphic output in the display unit 110, in the case of ② above, will be explained below. It is assumed that a format of resident attribute data having three-dimensional characteristics that are to be stored in the attribute data base 102 is managed in the relational format such that attribute items including resident ID, residence number, number of floors, resident name, telephone number, contract capacity, etc. are taken in the lateral direction and attributes for each resident are disposed for every item in the vertical direction, as shown in FIG. 4.

A flow diagram of processing for preparing a virtual residence layout diagram by using the attribute data base 102, will be explained with reference to FIG. 5. First, in Step 501, a variable St Max representing a number of a highest floor of a building is initialized. In Step 502, values of floor numbers are sequentially checked for all the columns of floor number items of the attribute data base (for example, FIG. 4). In Step 503, the values of floor numbers which have been obtained sequentially are set as a variable St Temp. In Step 504, a determination is made on whether a value of the variable St Temp is larger than that of the variable St Max which has been stored already. If the value of the variable St Temp is larger than that of the variable St Temp, the value of the variable St Max is replaced by that of St Temp in Step 505. By repeating the above steps, a maximum value of floor numbers St Max for the building can be obtained.

In Steps 506 and 507, the values of a counter Sb Max [I] from "1" to St Max are initialized to take values of zero, for checking a value of a maximum residence number for each floor of the building. In Steps 508, 509 and 510, a maximum residence number for each floor of the building is checked by referring to the residence number column of the attribute data base 102. In Step 508, the residence number column of the attribute data base is checked from the first to the St Max floors. In Step 509, residence numbers are checked repeatedly for the whole of any J-th floor. In Step 510, the obtained residence number is set as a variable Ls Temp. In Step 511, the variable Ls Temp is compared with a temporary maximum value of floor number SbMax [J]. If the variable Ls Temp is larger than the SbMax [J], the SbMax [J] is replaced by the variable Ls Temp in Step 512. By repeating the above series of Steps 508 to 512, a maximum number of residents on each floor is obtained.

Figure 6:
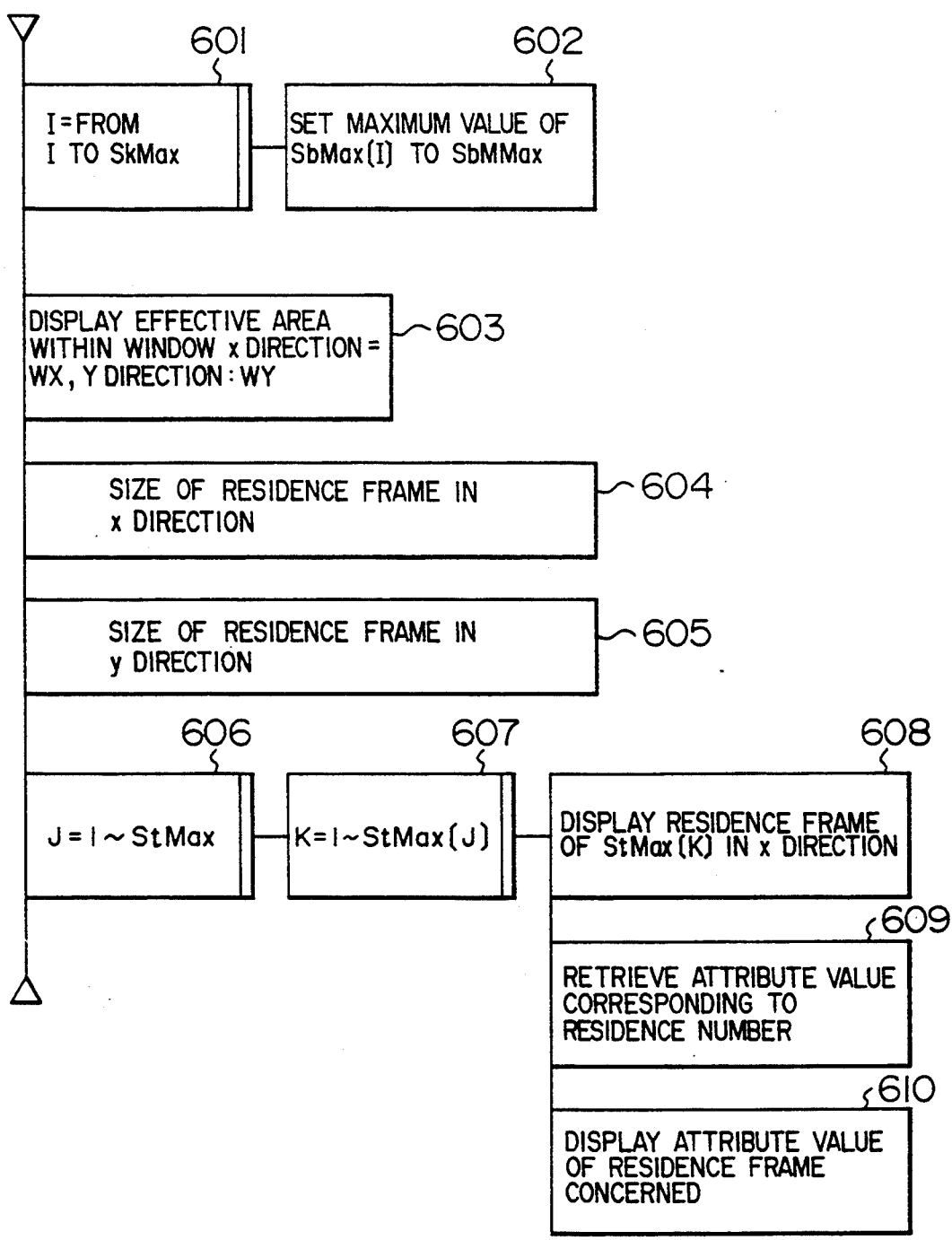
FIG. 6 is a diagram showing a detailed flow of the portion for exploding a residence shape in the flow of FIG. 5.

Last in Steps 513 and 514, a virtual development elevation diagram of the building as shown in FIG. 3 is obtained by referring to a value of the maximum number of residences SbMax [St Max] for each floor that has been obtained above. Various methods can be considered for preparing the development elevation diagram obtained in Steps 513 and 514. In this case, a method for disposing residences within the window by fixing the shape of a residence to a rectangle of constant dimensions is disclosed. The flow of the processing is shown in FIG. 6. In Step 601, the attribute data base 102 is checked from 1 to a maximum number of floors St Max of the building, to obtain a maximum number of residences on each floor. In Step 602, values of the residence number counters on each floor are each checked sequentially, to obtain a maximum value SbMax. In Step 603, an X direction size Wx and a Y direction size WY of an effective display area of the window for making a display of the residences is set. In Step 604, an X direction size DX=WX/SbM Max for a residence frame is obtained for displaying each residence within the building. In Step 605, a y direction size DY=WY/St max for a residence frame is obtained. In Steps 606 and 607, rectangles of St Max numbers in the vertical direction and Sb Max [J] numbers in a lateral direction, is prepared and drawn on the screen as shown in Step 608. Within each residence frame which has been drawn, various kinds of attribute data corresponding to the residence number are displayed as text data.

As a method for displaying a residence layout diagram to be prepared virtually, other modified display methods can also be considered, such as a method for selectively rearranging only residences of the same floor and displaying these residences by virtually dividing the building laterally, or a method for selectively rearranging only residences of the same residence numbers and displaying these residences by dividing the building vertically. These alternative methods can be realized by applying a processing of extracting data of the same conditions to the processings shown in FIGS. 5 and 6, by looking at the residence number column and the floor number column of the attribute data base 102 shown in FIG. 4. Since the flow of the processings shown in FIGS. 5 and 6 can remain the same to achieve the above processings, these processings are not explained.

Figure 7:
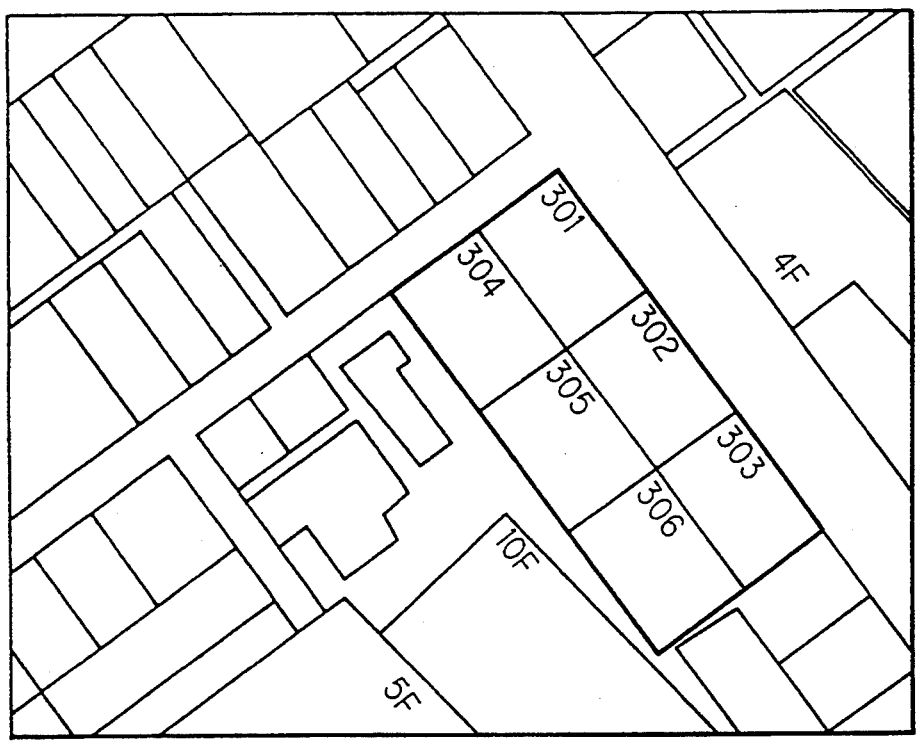
FIG. 7 is a diagram showing an example of displaying attribute data on the same window based on the present invention.

Detailed description has been made about the method of displaying resident attribute data having three-dimensional characteristics by correlating these data to the virtually prepared residence layout diagram at a proportion of one to one. A method of displaying the above in other format can also be considered. According to the method shown in FIG. 3, the residence layout diagram prepared virtually has been displayed in a window. According to the method to be described below, however, a virtual layout diagram is displayed at first within the frame of the building to be retrieved within the same window, as shown in FIG. 7. A method for preparing the virtual layout diagram will be explained below.

Figure 5:
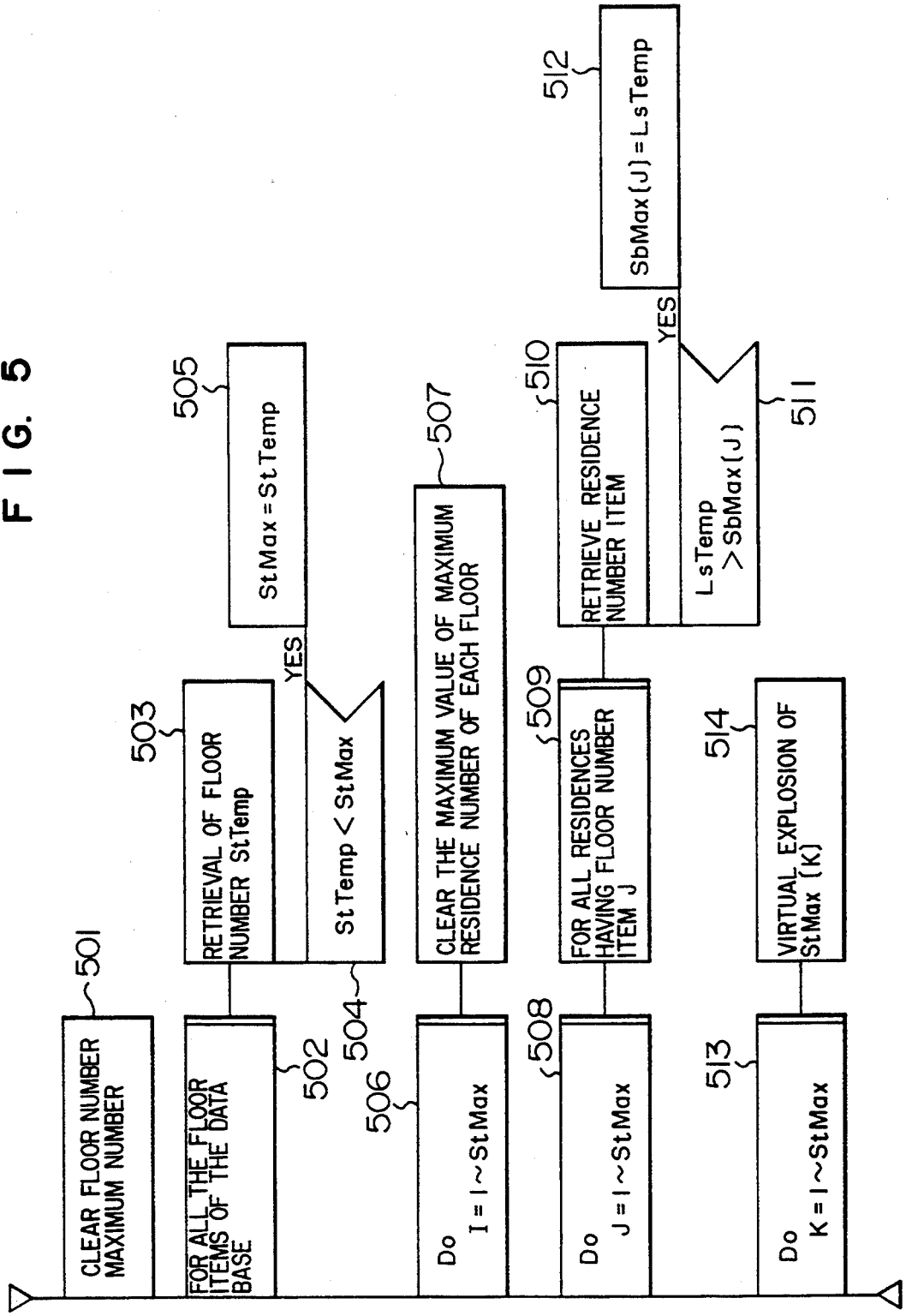
FIG. 5 is a diagram showing the flow of procedures for realizing the display of the attribute data shown in FIG. 3.
Figure 8:
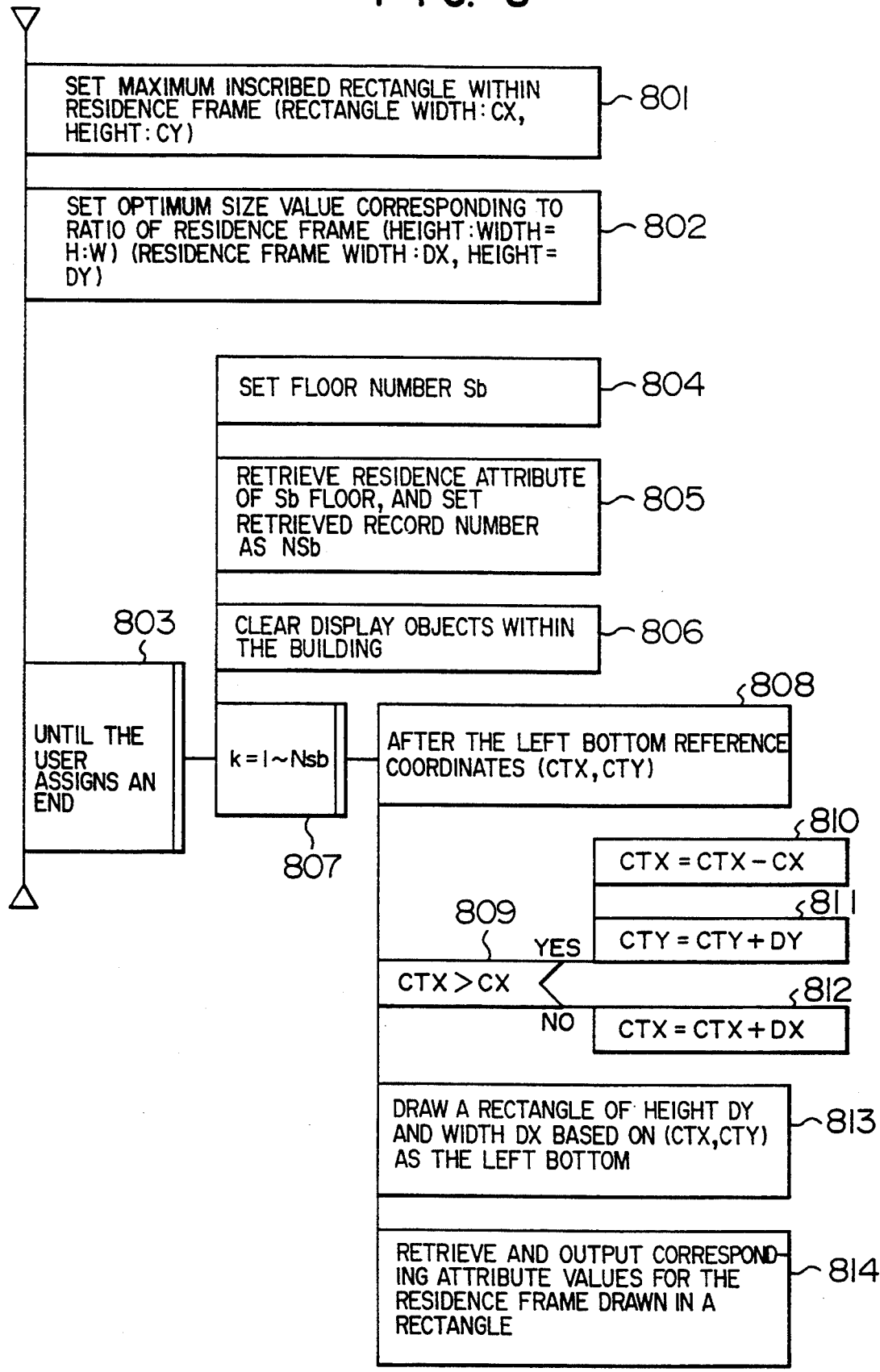
FIG. 8 is a diagram showing the flow of the method of displaying the attribute data shown in FIG. 7.

First, the content of the attribute data to be displayed is checked, to obtain a maximum floor number of a building St Max and a maximum residence number SbMax [j] or each floor based on the flow of the same processing as shown in FIG. 5. However, in the case of displaying this data, all the residence numbers within the building cannot be displayed at one time. Therefore, display of data is made after the user has designated, at the inputting/interpreting section 100 in FIG. 1, a condition for fixing only a certain floor of the building or for fixing a residence number, by dividing the building laterally or vertically. In this case, the residence layout diagram to be displayed has not been stored in the data base in advance. Therefore, it is necessary to process the data so that the data can be stored within the building to be displayed, if necessary. The flow of the processings is shown in FIG. 8, and the details of the processings will be explained below.

In Step 801, a maximum rectangle which can be drawn within a closed figure of the building to be displayed is searched and set, and the width and the height of the rectangle are expressed as CX and CY respectively. Next, in Step 802, optimum sizes (the width DX and the height DY) of the frame of the residence to be displayed within the rectangle are obtained. One of the methods for this is as follows. A ratio of the width to the height of the residence frame is decided in advance. By using this ratio, the size of a rectangle for a residence layout is decided such that there is minimum space between each square for showing each residence when a maximum number of residences SbMMax are arranged for each floor within the rectangle for showing the closed figure of the whole building. By using the width DX and the height DY of the rectangle for the residence frame obtained by the above procedure, the following processings are repeated until the user finishes the display assignment (Step 803). In Step 804, a floor number Sb of the floor concerned for assigning the portion for displaying the residence frame is set. All the residence attribute data belonging to the Sb floor are searched from the attribute data base 102, and the record number obtained is set as NSb (Step 805). In order to display the obtained residence attribute data together with the residence layout frame rectangle, the layout display already being displayed within the building is deleted first (Step 806). Then, the following display processing is repeated for the number of retrieved records NSb. In Step 808, the X coordinate CTX at the reference position down left in the residence frame rectangle is obtained by an expression CTX=CTX+DX. Next, whether the value of CTX is larger than the width of the inscribed rectangle within the building or not is checked (Step 809). If CTX is larger than CX, the display of the residence frame exceeds the width of the inscribed rectangle. Therefore, the size of CTX is adjusted by the width of the inscribed rectangle based on the expression CTX=CTX−CX (Step 810). For the size of the residence frame in the Y direction, the size is exploded in the downward direction based on the expression CTY=CTY+DY (Step 811). On the other hand, when CTX is equal to or smaller than CX, the display of the residence frame is accommodated within the width of the inscribed rectangle. Therefore, the width of the residence frame is simply increased based on the expression CTX=CTX+DX (Step 812). Then, with each (CTX, CTY) as reference coordinates down left, the rectangle of the height DY and the width DX for showing the layout of the residence frame is drawn inside the inscribed rectangle (Step 813). Corresponding attribute values are retrieved and formatted inside the rectangle for showing the layout of the displayed residence frame, and then the data is outputted (Step 814).

According to the present invention, attribute data having three-dimensional characteristics can be easily made to correspond to a two-dimensionally displayed map at a proportion of one to one without any duplication with the object of the map. Therefore, the operation at the time of a retrieval or editing is made clear, with a substantial improvement in the man-machine characteristics.

Next, another map information system of the present invention will be explained below with reference to the accompanying drawings.

Figure 9:
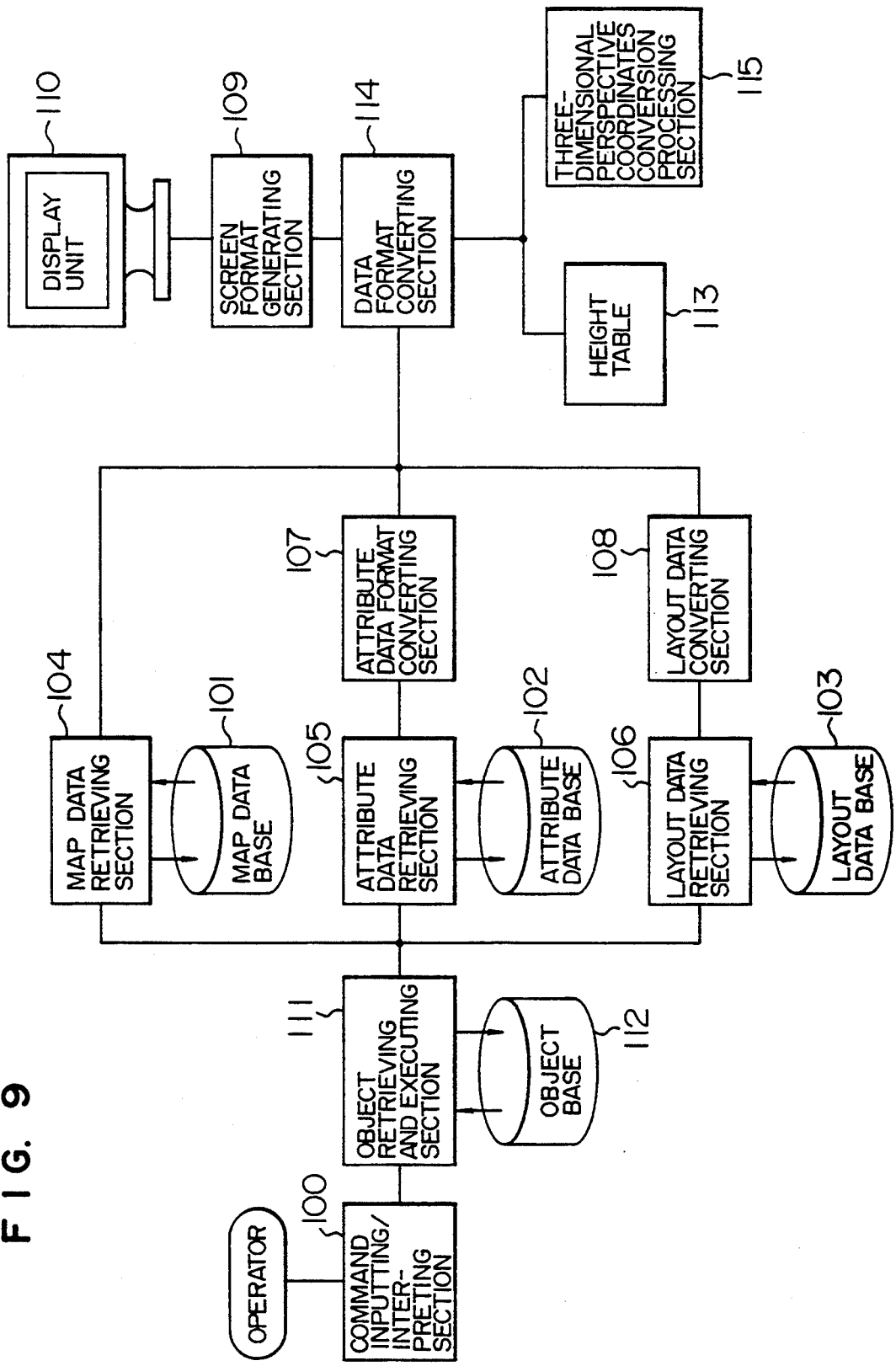
FIG. 9 is a block diagram showing another functional structure of the map information system according to the present invention.

FIG. 9 is a block diagram showing a functional configuration of the map information system. The system includes broadly four sections, that is, an operation section, a processing section, a data base section and a display section. The operation section includes a command input and interpretation section 100 for receiving a command from an operator shown at the left of FIG. 9 and interpreting the content of the command. The display section includes a screen format generating section 109 and a display unit 110 such as a CRT as shown at the right of FIG. 9. The data base section includes a map data base 101 for storing map data including data of various elements corresponding to figures and texts displayed on the display screen, an attribute data base 102 for storing attribute data or data associated with map data having three-dimensional characteristics and indicating an attribute of each house, e.g., {number of floors, a residential number, owner of the house, telephone number, etc.}, a layout data base 103 for storing a diagram of the layout, such as a shop layout diagram or a tenant residence diagram, which exists separate from the map data, and an object base 112 for storing, in an object format, information indicating a relation between objects and between media such as the map data, the drawing (layout) data and the attribute data. Each data base is stored in a different file.

The processing section includes an object retrieving and executing section 111, a map data retrieving section 104, an attribute data retrieving section 105, a layout data retrieving section 106, an attribute data format converting section 107, a layout data format converting section 108, a data format converting section 114, a height table 113, and a three-dimensional perspective coordinates conversion processing section 115. The retrieving and executing section 111 retrieves and executes entity objects from a plurality of objects, in accordance with the result of the interpretation by the section 100. The retrieving sections 104, 105 and 106 retrieve map data, attribute data and layout data in accordance with the execution of a map data entity object, an attribute data entity object, and a layout data entity object, respectively. The converting sections 107 and 108 match the display formats of the attribute data and the layout data to that of map data, respectively. For example, the display position of the attribute data is matched to that of the map data. The converting section 114 converts the formats of the map data and attribute data. For example, in the case of the three-dimensional display, height data is obtained by referring to the table 113, and the map data, the layout data and the attribute data are converted to three-dimensional data. When a bird's-eye display has been instructed, the section 114 initiates the processing section 115 so as to convert the coordinate system of the three-dimensional data from a world coordinate system to a viewpoint coordinate system. The height table 113 stores height data per one floor which has been determined in advance in accordance with types of figure data as a display element of the map data. Accordingly, when the section 114 refers to the table 113 in accordance with the types of display element and the number of floors, the height of the display element can be obtained.

Description will be made of an outline of a flow of a series of processings from data retrieval to a three-dimensional display which are to be carried out under the above-described structure when an operator has issued a request for making a three-dimensional bird's-eye display of a portion of a map. When an operator has issued the request for designating a range of the retrieval and for processing the retrieval or editing to the section 100, the section 100 converts the request into a message for an object and supplies the message to the retrieving and executing section 111.

When the message has been given to one among relational object groups which exist for each of various types of processings in the object base 112, a necessary number of messages are transferred to entity objects in accordance with a procedure in the relational object to which the message is given, so that each entity object initiates the retrieving section 104, 105 or 106 so as to retrieve the content of the data base 101, 102 or 103. First, the retrieving section 104 retrieves map data of an area designated by the request from the map data base 101 and converts the map data into display data. The retrieving section 105 retrieves three-dimensional attribute data having a correspondence relation with the retrieved map data and layout data from the attribute data base 102, and the converting section 107 converts the data format of the retrieved attribute data into a data format which corresponds to the retrieved map data and layout data. The retrieving section 106 retrieves, from the layout data base 103, the layout data corresponding to the figure elements of the map data which has been retrieved by the retrieving section 104. The layout data converting section 108 converts the layout data so that it is completely superposed on the corresponding figure element. The section 114 refers to the table 113 in accordance with the display format of data, and causes the section 112 to convert the data format. The generating section 109 converts the formats of the map data, the layout data and the attribute data as the display data from the section 114 into formats that fit for the screen, and displays the data on the display unit 110 such as a CRT. As described above, the data bases 101, 102, 103 and 112 of the map information system are divided into four data files. The map data and attribute data that have been indirectly extracted by being related to the relational object stored in the object base 112 are displayed in accordance with the processing procedures exclusively used for the media, respectively.

Separate from the above series of processings, in order to retrieve the map data and the attribute data, it is necessary to convert each of the contents stored in the data bases 101, 102, and 103 into an object and to transfer the converted object to the object base 112 to store it therein. The contents of the data bases 101, 102 and 103 necessary for a three-dimensional display are retrieved and extracted by the retrieving sections 104, 105 and 106, respectively, and are converted into objects by the section 111 such that the objects are stored in the object base 112. This series of processing is carried out whenever required and is processed at a timing different from that of the processing from the issuance of the request for retrieval from an operator to the three-dimensional bird's-eye display.

Figure 10:
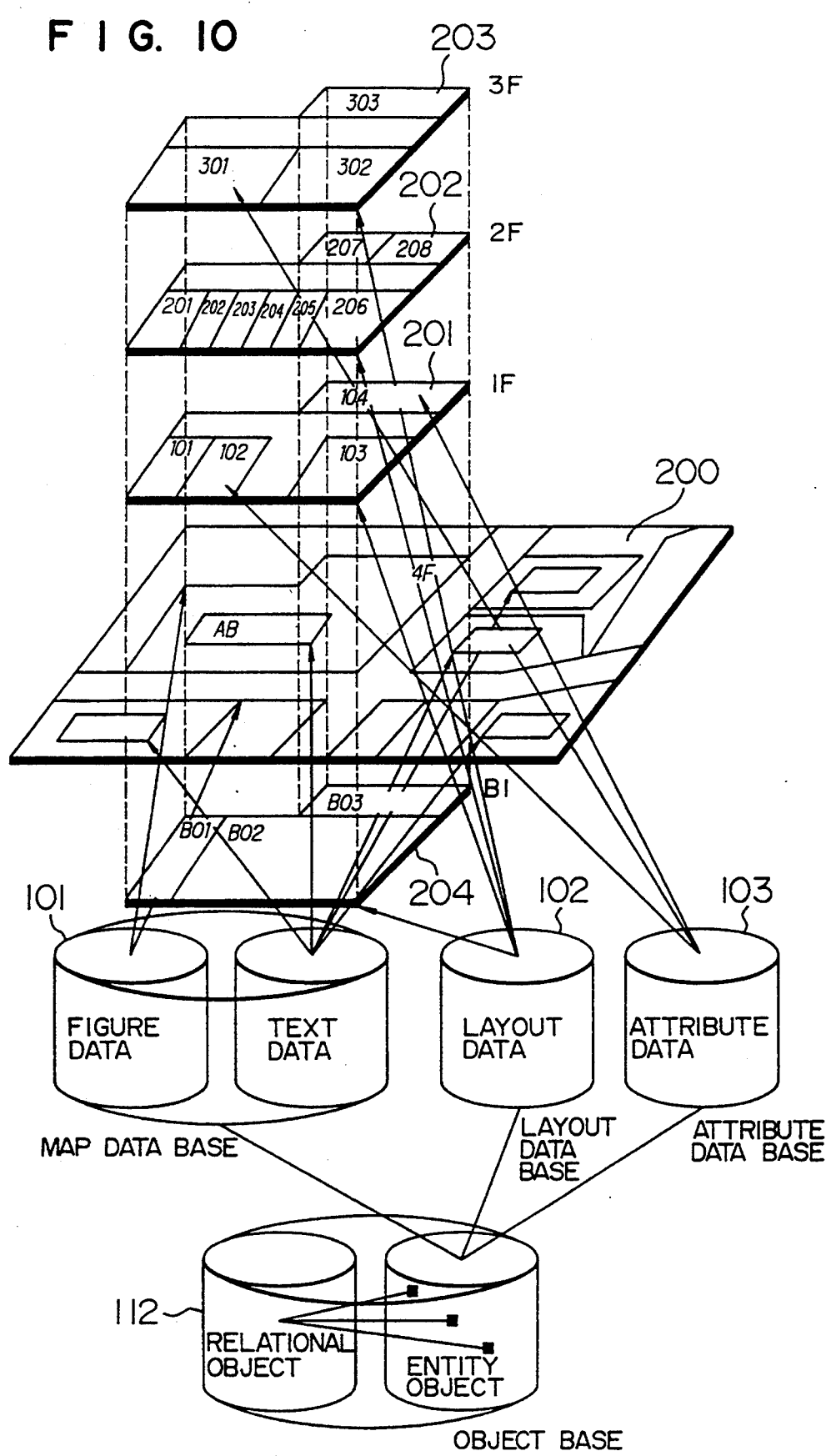
FIG. 10 is a diagram for showing the relationship between a relational object and an entity object including map data, attribute data and layout data.

FIG. 10 shows the contents of the four data bases 101, 102, 103 and 112 relating to the map displayed on the display unit 110. The map data base 101 stores figure data of roads and house frames and text data for names of places, which are necessary for displaying a normal two-dimensional map. Further, residence layout data 201, 202, 203 and 204 for showing the residence layout of each floor are stored in the layout data base 102. The layout data base stores mainly a border figure of residence frames of each floor, and does not necessarily store residence numbers and names of residence owners. Residence numbers and names of residence owners may be retrieved from the attribute data base 103 and displayed so as to be accommodated within each residence frame by processing or modifying the format, as shown in FIG. 10. The object base 112 stores entity objects, each of which is is made to correspond to a content of each of the data bases 101, 102 and 103, and relation objects which describe relations between the entity objects.

Under the above-described system configurations and process flows, the data structure of each data base will be explained in sequence.

The map data is divided into a figure portion and a text portion as shown in FIGS. 11A and 11B respectively. Each data portion is of a sequential format of a variable length. The figure portion in FIG. 11A is composed of a figure table header and records. A file size of the whole figure portion and the number of records are stored in the file table header, and in each record are stored data indicative of the number $N_1$ of constituent points of coordinates that constitute a figure, a type of line KL1 for designating a type of the figure, and a color in drawing the figure and so on; information SI, and EI indicative of a starting point and an ending point of the figure necessary for knowing a state of processing in editing; and X coordinates and Y coordinates ($X_1$, $Y_1$, ... $X_M$, $Y_M$, ... $XN_1$, $YN_1$) for the number of the constituent point.

The text portion in FIG. 11B is composed of a text table header and records. A file size of the whole text portion and the number of records are stored in the file table header, similar to the figure portion, and in each record are stored data indicative of the number $M_1$ of constituent letters which constitute a text, a type of text KT1 for determining a font of the text, such as a classic Chinese letter font or a Gothic letter font, a box width $W_1$ and a box height $H_1$ for giving a width of a circumscribed rectangle relating to the size of each text letter, a slope angle $V_1$ of each text letter within the circumscribed rectangle, a rotation angle $R_1$ for rotatingly displaying a plurality of letters as a text, a flag $F_1$ for controlling the direction vertically or laterally displaying the text, X coordinates $X_1$ and Y coordinates $Y_1$ of a reference point indicative of a reference position for displaying each text, and text code data ($TC_1$, $TC_2$, ... , $TCM_1$) for each text.

The data structure of the third layout data base 103 has two types of, including a figure portion and a text portion. The data structure may be exactly the same as the data format of the map data base 101 shown in FIGS. 11A and 11B. However, the reference coordinates of the figure may be independent of the reference coordinates of the map data base 101, and the coordinate conversion parameters such as expansion, compression and movement for completely superposing the layout data on the map data are stored in the relational object within the object base 112.

The attribute data base 102 is structured of resident attribute data having three-dimensional characteristics, and this is a relational data base as shown in the reference 3 which can store and manage various types of attribute values in a resident unit. As shown in FIG. 12, items {a resident identifier, a residence number, a number of floors, a name of the owner, etc.} are set in the lateral direction of the attribute data base, and attribute values of each resident are stored and managed in the vertical direction thereof. By the above arrangement, conditional retrieval subject to each item of attributes, which is a feature of the relational data base, becomes possible. For example, a conditional retrieval for retrieving names of residents living in the second floor of a house with 3DK (three living rooms and a dining kitchen room) becomes possible by using a structured query language (SQL) which is a standard language for a retrieval procedure shown in the reference 3.

Before describing the structure of the object base 112, definition and characteristics of a relational object in the present embodiment will be made clear. In general, an object means a capsuled unit of defined data and a procedure for directly processing the data, as shown in the reference 4. Usually, the relational object refers to a unit which can be described in an object-oriented language as shown in the reference 4. The structure of objects includes classes, in each of which a common concept can be defined hierarchically and instances, in each of which the definition of each class is expressed in an inherent value. A class can generate inherent instances when necessary, and a group of instances generated by the same class can hierarchically inherit and share definitions of variables and procedures of the class. For example, an object can be described in the following format by using an object-oriented language, objective-C, which is shown in the reference 4:

---
object = name of a class: super-class name (message: group 1, group 2, ... )
{declaration of an instance variable}
+ a single term selector {a factory method definition}
− a single term selector {an instance method definition}
+ selector 1: a temporal argument 1, a selector 2: a temporal argument 2, ... {a definition of a class method}
− a selector 2: a temporal argument 1, a selector 2: a temporal argument 2, ... {a definition of an instance method}.
---

In the above description, the factory method is a definition of a detailed procedure for generating an instance by each class. In the case of Objective-C, the procedure is described in the C language. A selector has identifiers which are necessary for receiving a message to make a request to each method, and a single-term selector means a selector having only one identifier.

From the viewpoint of describing multimedia such as figures and images, objects can be classified into entity objects and relational objects, as shown in the reference 5. An entity object is a description of a set, including a definition of data and a processing procedure, for the media data, the media data being a single kind of media itself such as a figure or an image. On the other hand, a relational object is for establishing a meaningful relation among a plurality of media including resident attributes and figures of house frames or among a plurality of other relational objects and is a description of a combination of pointer information to entity objects and procedures for mainly issuing a message to each entity object.

First, the structure of an entity object will be explained based on an example of a description of the entity object from the viewpoint of making a three-dimensional bird's-eye display of a house frame designated on a housing map.

Figure 14:
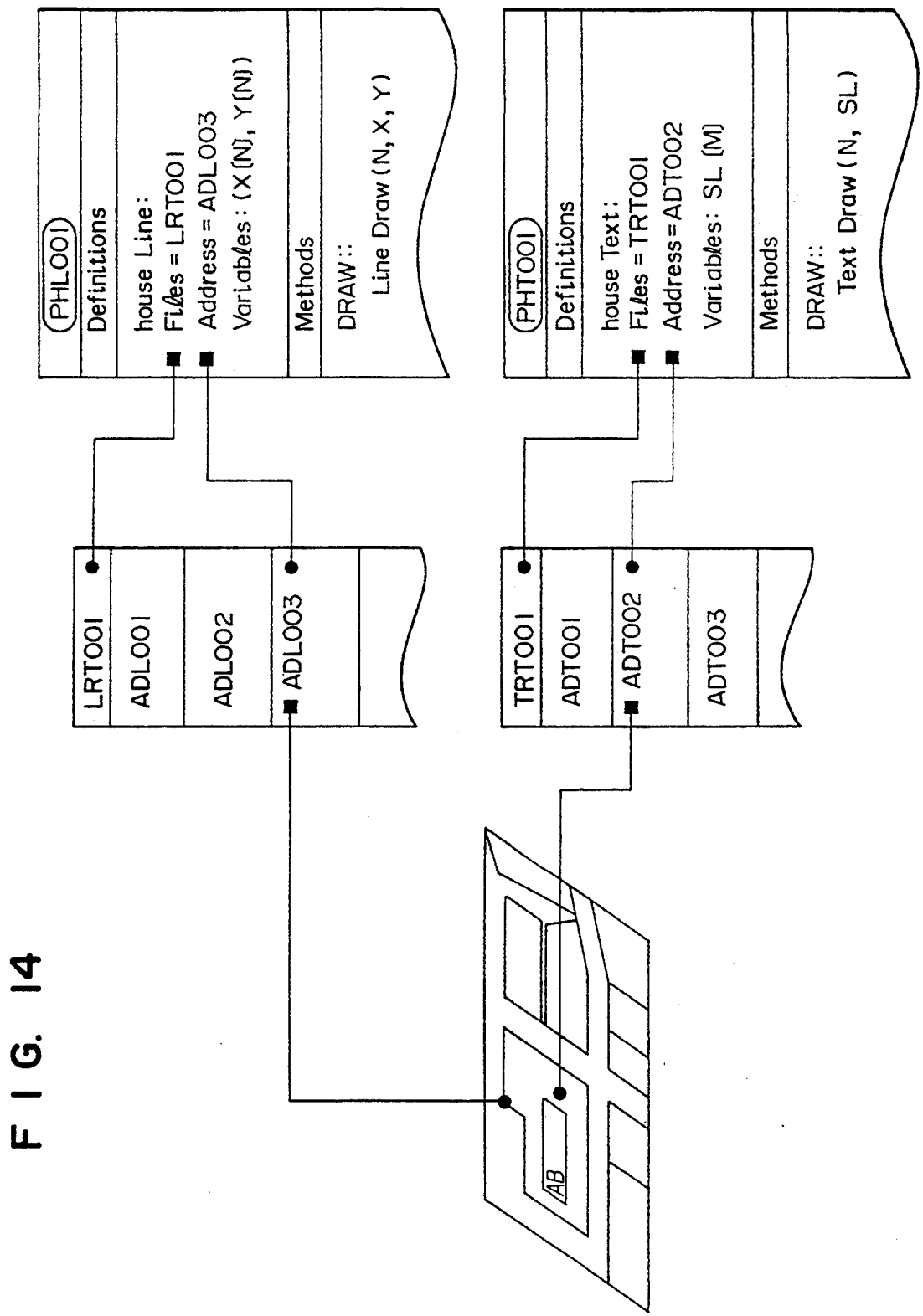
FIG. 14 is a diagram showing a relation among a two-dimensional display of a map, a figure entity object and a text entity object corresponding to a house.

FIG. 14 shows a structure of a figure entity object PHL001 indicative of a house frame and a structure of a text entity object PHT001 in correspondence with map data. A figure record and a text record, which correspond to a house frame of each resident, are described in a table file LRT001 which structures the figure portion of the map data and in a table file TRT001 which structures the text portion shown in FIGS. 11A and 11B, respectively. Each of the figure and text records can be independently accessed in accordance with address information ADL001, ADL002, ..., ADT001, ADT002, ... for indicating a position of the record in the table file of variable length and the number of constituent points or texts in the record. Of the figure entity object PHL001 of the house frame, in the Definitions are defined a file pointer Files=LRT001, a record pointer Address=ADL003 and entity variables X[N] and Y[N], and in the Methods is described a procedure LineDraw (N, X, Y) for displaying a figure of the house frame. On the other hand, of the text entity object PHT001 of the house frame, in the Definitions are defined a file pointer Files=TRT001, a record pointer Address=ADT002 and an entity variable SL[M], and in the Methods is described a procedure TextDraw (N, SL) for displaying a text string for the house frame. Therefore, by giving only a message DRAW for a display request to these objects, the procedures LineDraw (N, W, Y) and TextDraw (N, SL) in the Methods of the objects are initiated to display the house frame and the text string on the display unit 110.

FIG. 15 is a diagram showing an example of a three-dimensional bird's eye display of an apartment house AB of the map data shown in FIG. 14. In response to a command for a bird's eye display in a map data entity object, reference height data is obtained by referring to the height table 113 in accordance with the floor data of the apartment AB of the attribute data, and the reference height data is multiplied by the number of floors so as to obtain the height of the apartment AB. Next, the three-dimensional map data and attribute data are sent to the section 115 which carries out a conversion processing. The result of the processing is displayed on the display unit 110 through the section 109. The display position of the attribute data, e.g., the display position of the text data "AB apartment" is altered by the section 107 from the position shown in FIG. 14 to the position shown in FIG. 15 to match the three-dimensional display of the map data.

Figure 17:
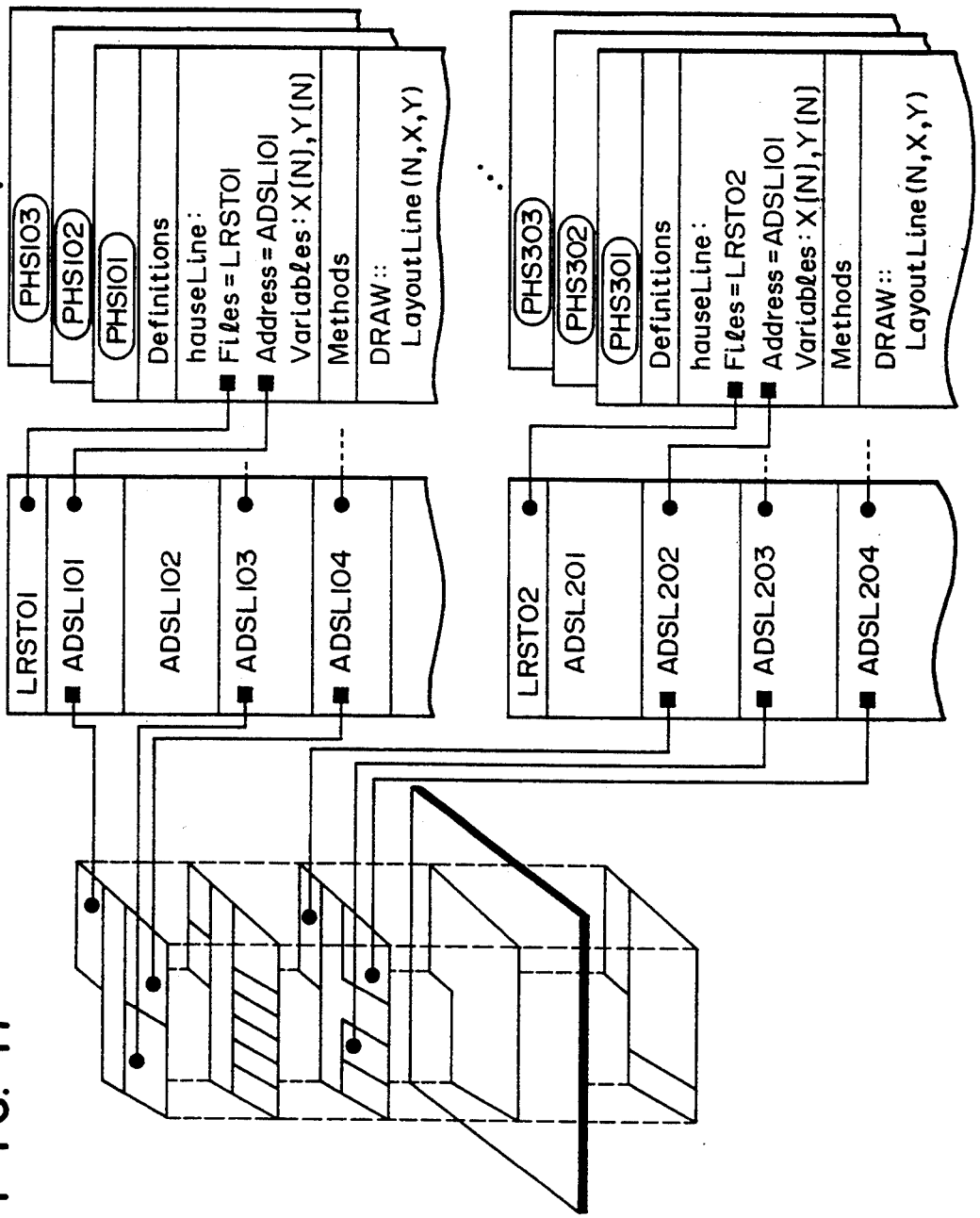
FIG. 17 is a diagram showing the figure entity object structure of layout data in a floor unit.

FIG. 17 shows a structure of each of various layout entity objects {PHS101, PHS102, . . . , PHS201, PHS202, ... } which are indicative of layouts of respective floors within an apartment. Each of the objects has a one-to-one correspondence relation with one of the layout files {LRST01, LRST02, ... }. These layout files have the same format as the figure section of the map data shown in FIG. 11A and each layout data is described as a figure record in one-to-one correspondence relation with one resident. Also, the layout data can be accessed independently in a unit of figure record by use of the number of constituent points and address information {ADSL101, ..., ADSL201, . ..,} pointing to the position of the figure record in the file table of variable length.

Figure 13:
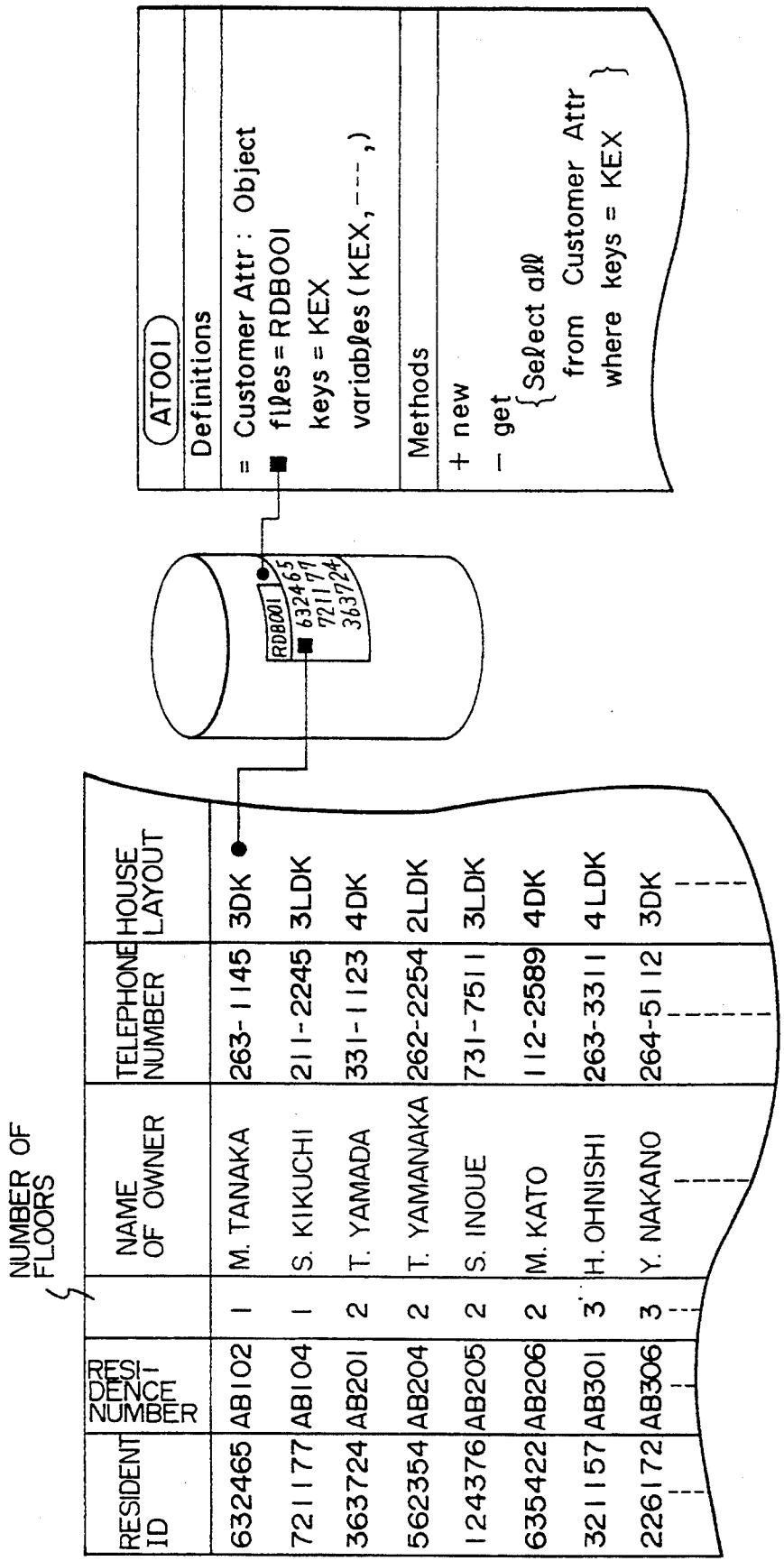
FIG. 13 is a diagram showing a relation between an attribute entity object and attribute data.

FIG. 13 shows a structure of an attribute entity object AT001 of a resident. As shown in FIG. 12, the attribute data base is of a relational structure having attribute items in the lateral direction and individual personal data in the vertical direction, and can be accessed independently for each column. The object AT001 includes pointer information such as a pointer for an attribute data file, Files=RDB001, and a pointer Keys=KEX as a pointer indicative of the position of an objective record in the file in the Definitions and a retrieving procedure in a record unit subject to a retrieval language SQL for the relational data base in the Methods. Accordingly, in order to retrieve attribute data of one record for a resident having KEX as a resident ID, by only sending of a retrieval request message GET having a parameter of KEX to the object AT001, the retrieving procedure in the object AT001 is initiated, thereby to obtain attribute data.

The above describes the structure of an entity object closely related to each media. A relational object is also stored in the object base 112. As described already, the relational object is for establishing a meaningful relation among a plurality of media for purpose of three-dimensionally identifying residents within an apartment. The relational object describes a combination of pointer information for relating necessary ones among the entity objects described above and a procedure mainly for transferring a message to each entity object. In order to simplify the internal structures of relational objects of a hierarchical structure, there are some relational objects which intermediately group entity objects for medias of the same kind.

Figure 16:
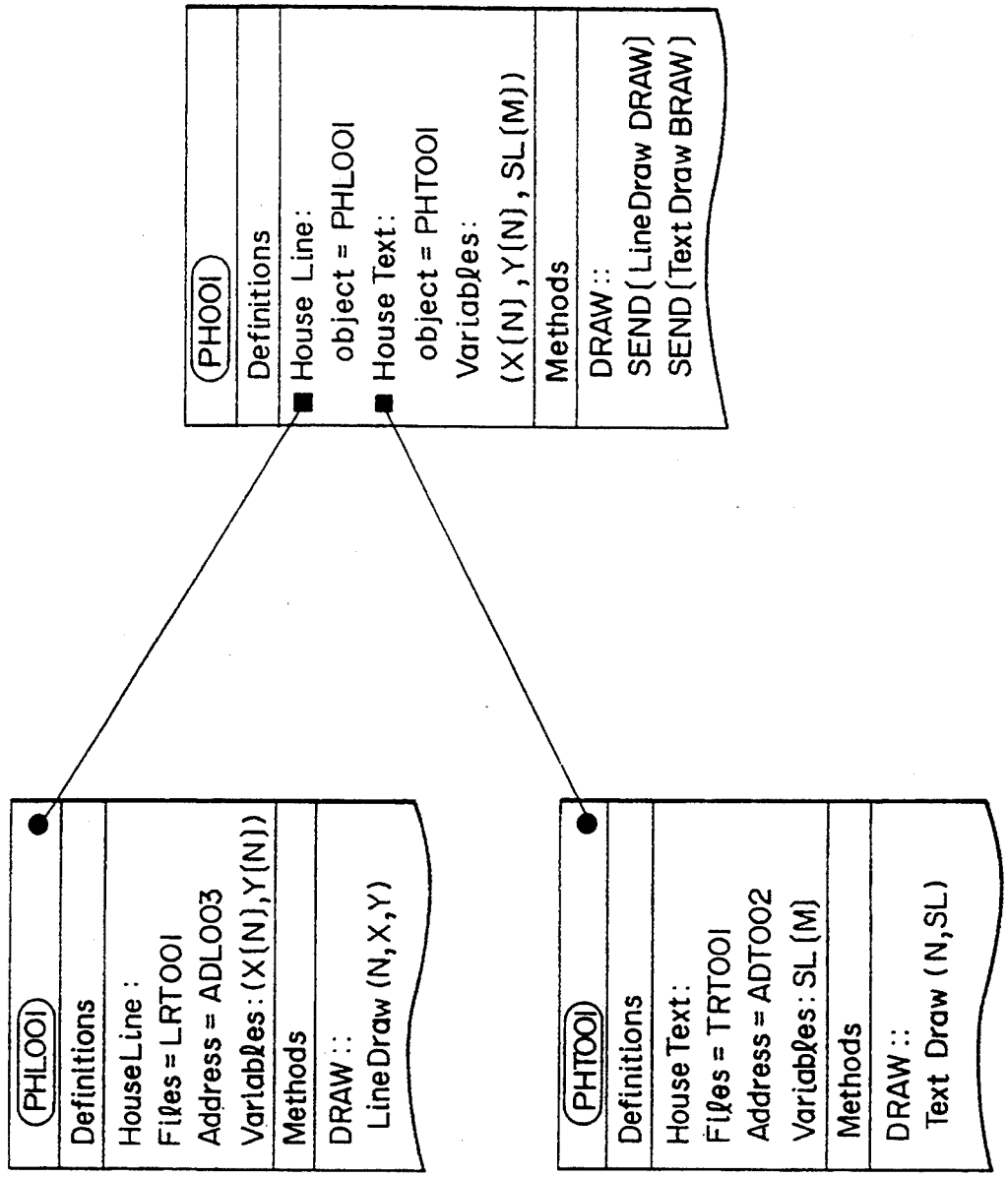
FIG. 16 is a diagram showing a relation among a relational object, the figure entity object and the text entity object.
Figure 18:
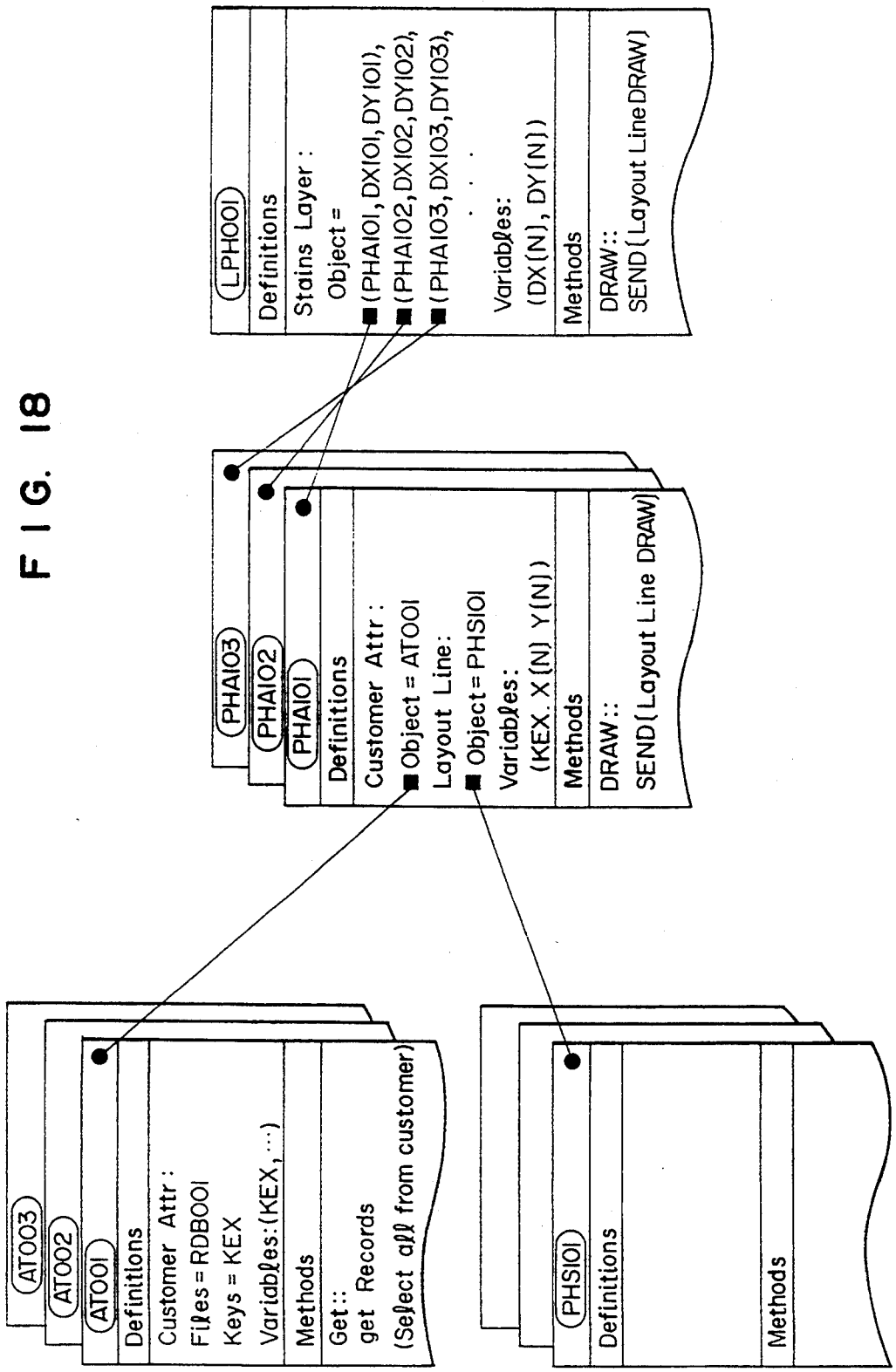
FIG. 18 is a diagram showing a hierarchical structure relational objects and entity objects.

FIG. 16 shows a relation object PH001 for relating the figure entity object PHL001 and the text entity object PHT001 of the house frame shown in FIG. 14. When a message DRAW for requesting a display is given to the object PH001, the messages given to the Methods of object PH001 are transferred to the objects PHL001 and PHT001, which are defined in the Definitions of the object PH001, by a message transfer function between objects, thereby to initiate the procedure LineDraw of the object PHL001 for displaying a house frame and the procedure TextDraw of the object PHT001 for displaying a house name. As a result of initiating the object PH001, the house frame and house name can be displayed. Thus, the structure of the relational object PH001 can be simplified. As shown in FIG. 18, a group of entity objects (PHS101, PHS102, ...) for a layout of houses or rooms within an apartment and a group of attribute entity objects of individual persons (AT001, AT002, ...) are related to generate a group of relational objects (PHA101, PHA102, ...). Further, the objects associated with the same floor are grouped to generate a relational object LPH001. By this, the structure of the relational object LPH001 can be further simplified.

Figure 19:
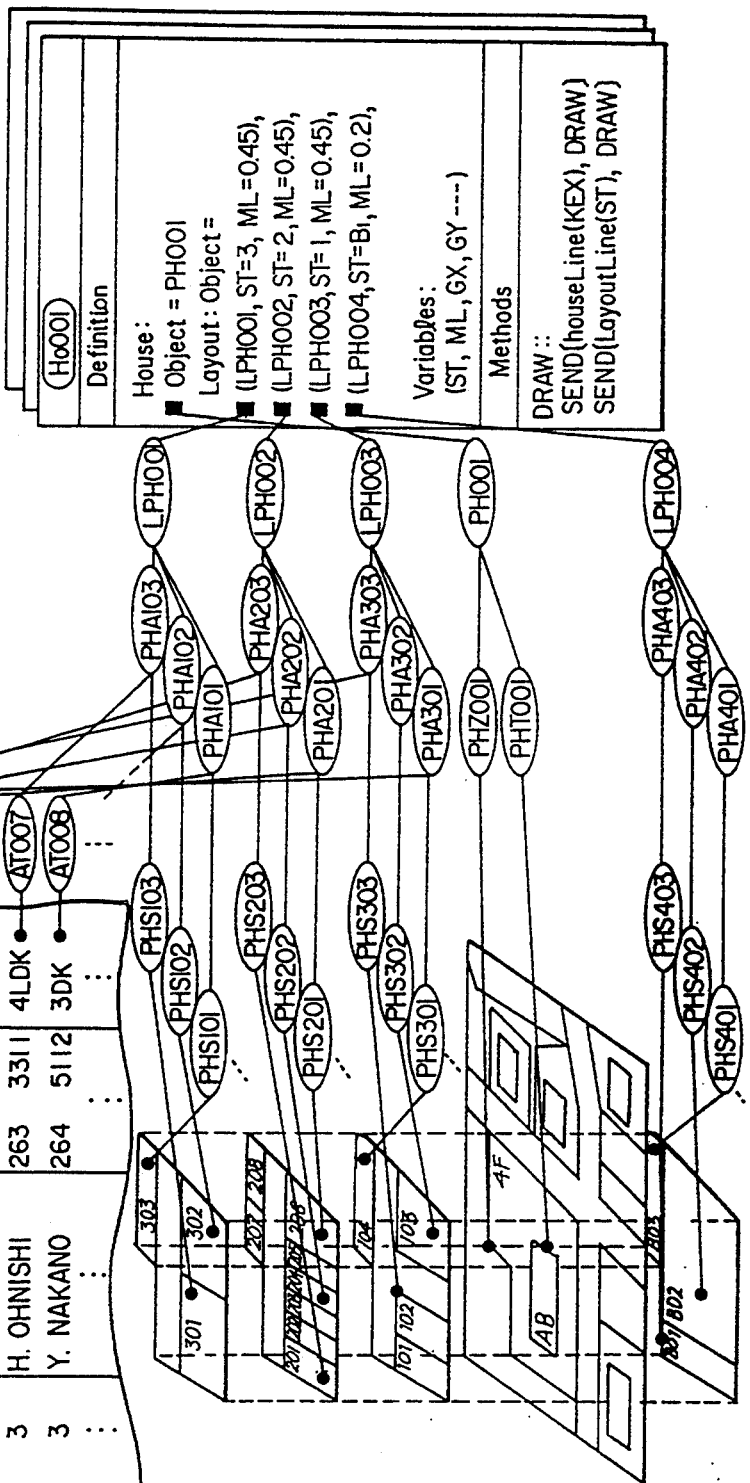
FIG. 19 is a diagram showing the structure of a relational object which relates each entity object of residence, attribute and layout to a grouped relational object, to show residences in a floor unit.

Last, as shown in FIG. 19, when a relational object H0001 for summarizing media meaningful for the apartment is generated, the object H0001 relates the groups of entity objects (PHS101, PHS102, ...), (AT001, AT002, ...) and (PHL001, PHT001, ...) corresponding to each media described above, to the groups of relational objects (PHA101, PHA102, ...), (LPH001, LPH002, ...) and (PH001, PH002, ...) which are the result of having grouped the entity objects at an intermediate stage. Further, the procedure portion thereof describes a transfer procedure for transferring a message for each entity object. Thus, in order to display map data of the apartment, the message DRAW is given to the object H0001 with the selectors LineDraw and TextDraw.

In order to display data of room layout of individual persons, the message DRAW is given, together with the selector Layout Draw, to the object H0001. Particularly, a procedure for adjusting parameters such as display positions and multiplication factors becomes necessary for making a display of a complete superposition of room layout on the result of displaying the group of houses on a map. These parameters can be defined by filling in the variable definition portion and the procedure portion of the relational object H0001 and LPH001, thus requiring no separate arrangement.

Figure 20A:
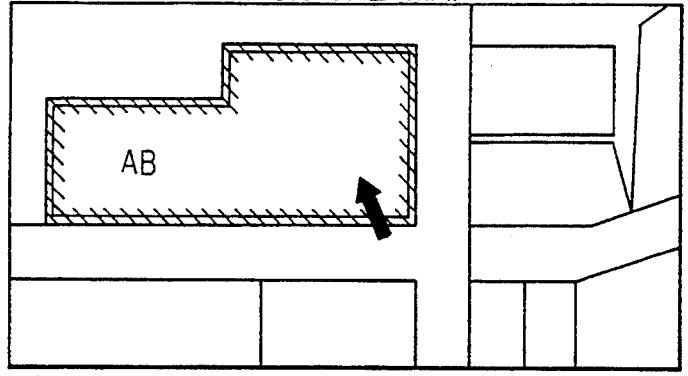
FIGS. 20A, 20B and 20C are diagrams for showing the state that layout data and attribute data are superposingly displayed on the map in a floor unit based on the present invention.
Figure 20B:
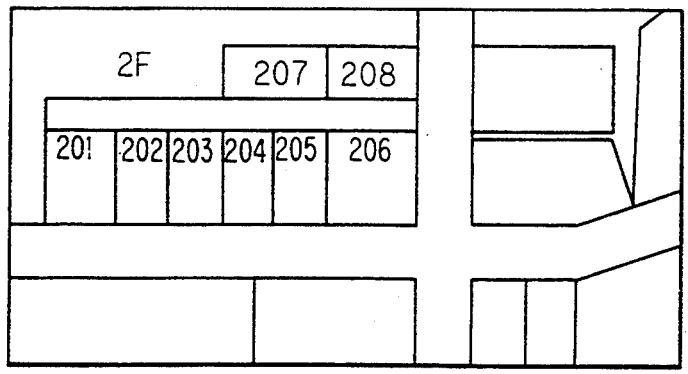
Figure 20C:
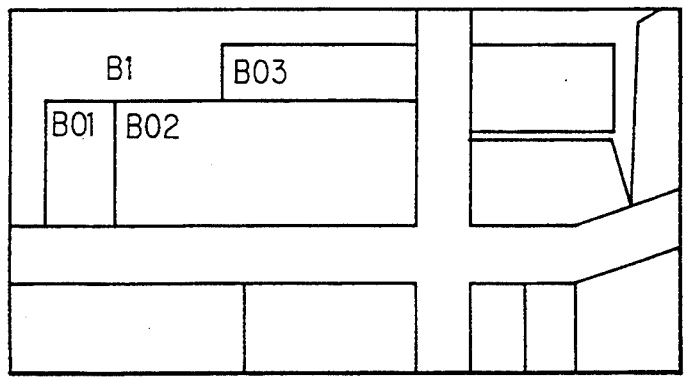

Next, description will be made of the method for making an effective display of the map data in one-to-one correspondence relation without any inconsistency by using map data objects, layout data objects and attribute data objects explained above. First, consider the case where the map data is displayed two-dimensionally on the display unit 110 in the same method as the conventional map displaying method, as shown in FIG. 20A. According to this display, each of many residents in an AB apartment in FIG. 20A corresponds to one of the building frames of the AB apartment, and it is impossible to investigate details of individual residents such as each resident name or retrieve various attributes associated with each resident. To avoid this problem, the operator designates a floor number to be retrieved, so that layout data of the residences belonging to this floor are displayed in the form to completely superpose on the building frame concerned. With this arrangement, attribute data and residence positions having one-to-one correspondence relation can be identified. Examples of this display are shown in FIGS. 20B and 20C. In FIG. 20A, the operator designates a periphery of the AB apartment to be retrieved with a pointing device such as a mouse. Then, the operator designates a floor number of the AB apartment, so that the layout data of the designated floor are superposingly displayed on the AB apartment frame. FIG. 20B shows the state that the layout data of the second floor are displayed, and FIG. 20C shows the state that the layout data of the underground portion are displayed. When the operator designates individual residence frames of the layout data of each floor, the attribute data relating to these residents can be retrieved with a complete one-to-one correspondence relation. What is important in this display method is as follows. Unlike the display shown in FIGS. 26 and 27 where the layout data for each floor are displayed in an independent window different from that for the building, the layout data are completely corresponded to the building and that even if the size of display or angle is changed from the original one due to a change of retrieving condition, the superposition display can completely follow this change.

Figure 21:
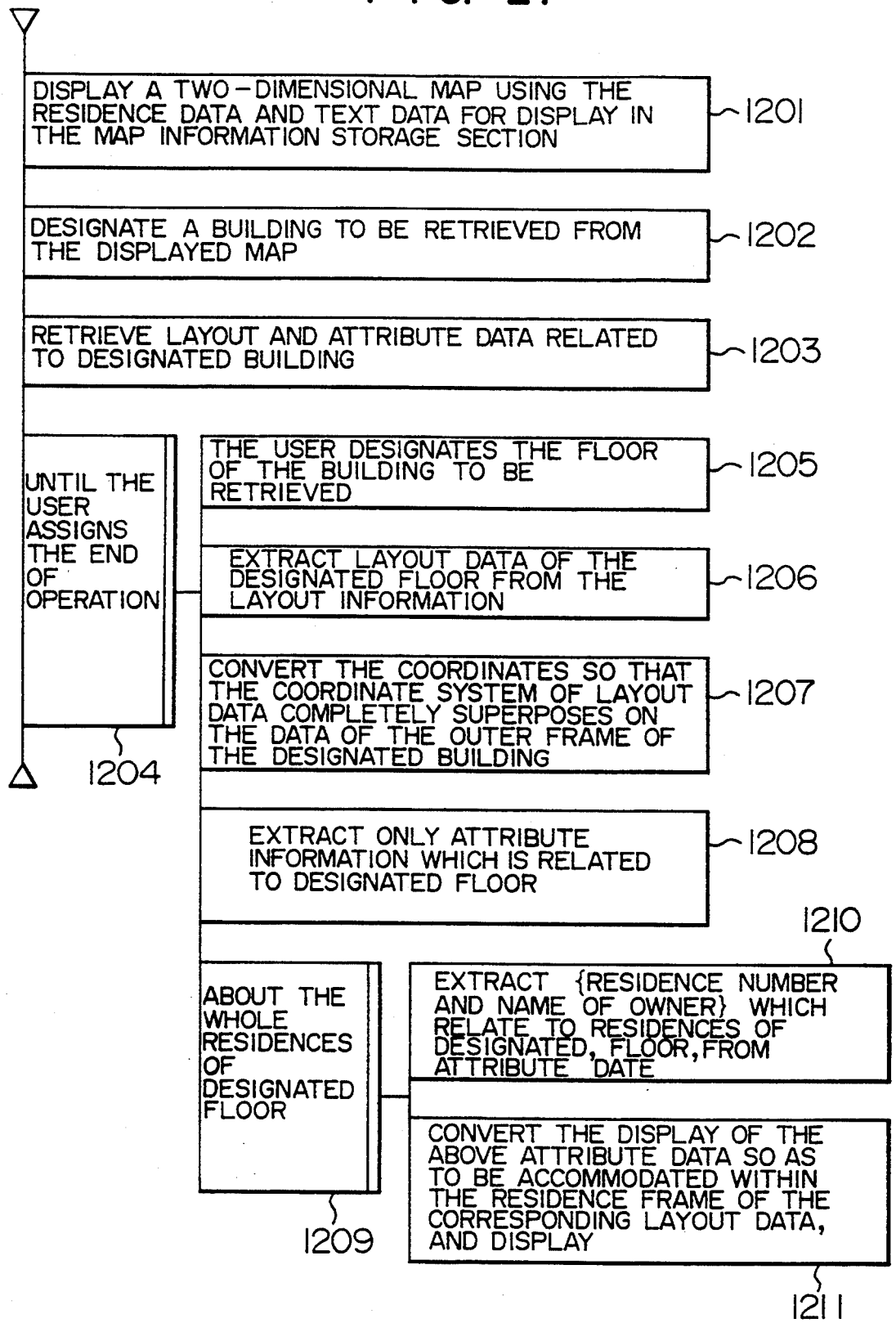
FIG. 21 is a diagram for showing an algorithm for processing the display of the map diagram shown in FIGS. 20A to 20C.
Figure 22:
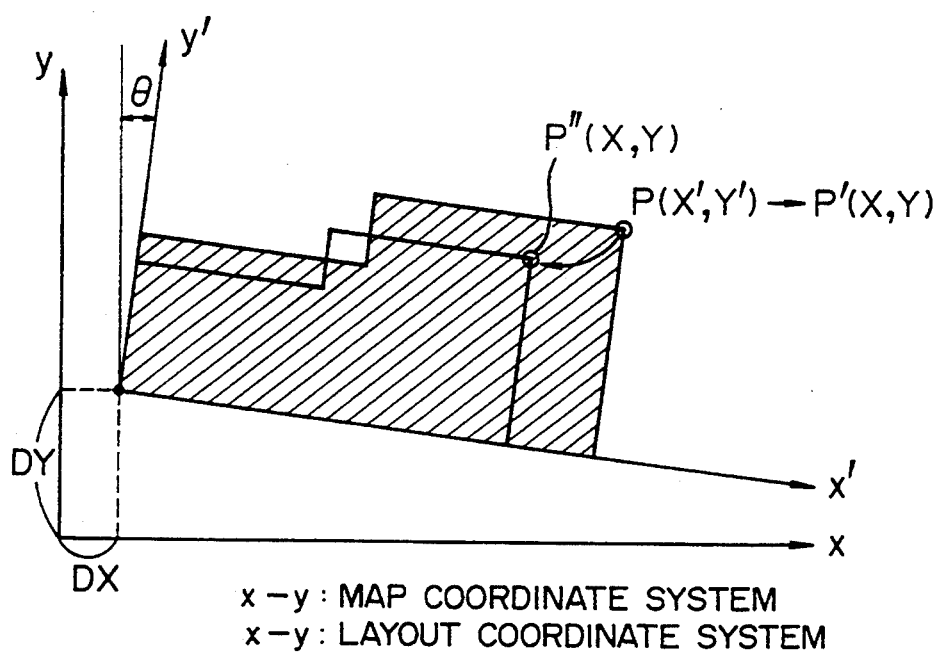
FIG. 22 is a diagram for showing the relationship between the outer frame of a residence in a map coordinate system and layout data in a layout coordinate system.

The flow of processing for realizing the display method of attribute data shown in FIGS. 20B and 20C will be explained below with reference to FIG. 21. First, in step 1201, the figure portion and the text portion of map data are taken from the map data stored in the map data base 101 in the format as shown in FIGS. 11A and 11B, and these data are displayed as a two-dimensional map on the screen of the display unit 110. As an example of this display, shapes of buildings such as a church and a police station and roads together with their names are displayed. Accordingly, in the case of the two-dimensional display, only the name of a building and representative's name are displayed for an AB apartment house. Detailed layout within the building is not displayed at this stage. In step 1202, a building for which three dimensional attribute data are to be retrieved is designated on the screen of the display unit 110. Usually, the operator designates the building to be retrieved with a pointing device such as a mouse. A detailed processing for this designation is as follows. Assume the position coordinates to be designated on the screen of the display unit 110 by the pointing device is expressed as MP (MPX, MPY). The distances between from the MP point to the figure portion coordinates {X1, Y1, ---, XM, YM, ---, XN1, YN1} in FIG. 11A and the text portion reference coordinates (X1, Y1) in FIG. 11B are compared with each other so that the shortest instance can be found, and then a building concerned with the shortest distance is displayed in a flickering color on the screen. Thus, the designation is achieved. In Step 1203, the residence layout data and the resident attribute data which relate to the building designated in the preceding step are retrieved and displayed. As conditions for the retrieval of the layout data, the attribute data are used as a key for relating the layout data to the designated floor number to display the layout of the building and the figure number added to the building. For displaying the residence layout, a display request message DRAW with a parameter of the designated floor number and a selector Layout Draw: may be applied to an apartment house relational object H0001 shown in FIG. 19. Then, by the message transfer function between objects, the message is transferred to entity objects PHS** having the procedure of Layout Draw, and this message is executed by the entity objects. For retrieving the attribute data similar to the retrieval and display of the layout data, a retrieval request message GET with a residence ID parameter and a selector getRecords: is applied to the apartment relational object H0001. Then, by the message transfer function between objects, the data base retrieving procedure, getRecords, written in SQL is initiated, and target attribute data is obtained. A Step 1204 means to repeat a series of steps from Step 1205 to Step 1211 by the number of floors within the building. By the operation using a mouse or keys designating a position on the screen of the display unit 110 by the operator, a layout position within a floor of the building can be designated as shown in Step 1205, and an ending condition for ending the series of operations can be given. In Step 1206, only the data for the designated floor are extracted from the layout data and the attribute data relating to the building which have already been obtained by designating the building on the display screen 110 in Step 1203. The format of the layout data of the designated floor displayed at this stage is the same as the format of the map data as shown in FIGS. 11A and 11B. As explained above, the coordinate system is independent and the size is not standardized. Therefore, in order to completely match the layout data with the map data, the coordinate origin, the coordinate rotation and the coordinate expansion/contraction are converted (Step 1207). In order to display the layout data so as to completely superpose it on the map already displayed, an affine transformation as shown in the above reference 2 is carried out. For the parameters for carrying out the affine transformation, it is necessary to determine a deviation from the coordinate origin (DX, DY), an angle of the coordinate rotation (θ) and a contraction factor ML*. However, in general, there is degree of freedom in the registration of a layout figure. Therefore, in the present embodiment, both the layout and the map are based on the matching of a circumscribed rectangle. The matching of the reference coordinates is determined based on the left lower point of the long side of the circumscribed rectangle viewed horizontally, an angle formed by long sides for a rotation angle, and a ratio of the size of the long side to the size of the short side between the circumscribed rectangle for a contraction factor. Therefore, a value of the factor ML defined in the apartment relational object H0001 and an offset position (DX101, DY101) defined in a relational object LPH001 for grouping the layout in a floor unit are used. A detailed method of transformation is as follows. As shown in FIG. 22, the coordinates of a point P (X', Y', ) defined by a layout coordinate system {X'—Y'} having an angle θ and deviations (DX, DY) from an origin of the map coordinate system [X—Y] is transformed to a point P' (X, Y) by the following transformation expressions:

$$X = X'\cos\theta - Y'\sin\theta + DX$$

$$Y = Y'\sin\theta + Y'\cos\theta + DY$$

The point P' (X, Y) is transformed to a point P'' (X, Y) based on the following transformation expressions, by considering a contraction factor from the correspondence between the residence and the layout drawings:

$$X = (X'\cos\theta - Y'\sin\theta + DX)/ML$$

$$Y = (Y'\sin\theta + Y'\cos\theta + DY)ML$$

The displayed layout data having a complete matching with the corresponding building on the map is only a layout frame of each residence. Since the attribute data relating to the designated building have already been extracted from the attribute data base 102, only the attribute data of the floor corresponding to this layout data are extracted in Step 1208. In Step 1209, Steps 1201 and 1211 are repeated. In Step 1210, attribute data having a correspondence relation with each of houses defined by the residence frames on each floor are extracted, and only specific items such as a residence number, a name of the owner, etc. are extracted from these data. In Step 1210, the size of the attribute data having a one-to-one correspondence relation with the residence frame is converted to be accommodated within the residence frame, and the result is displayed. The conversion of the size of the attribute data to be accommodated within the residence frame is performed in accordance with the size of the circumscribed rectangle and the size of the residence frame, so that the circumscribed rectangle of the text data for the residence number row and the names of owners shown laterally can be determined to be accommodated within the residence frame.

Description has been made about a method for displaying the layout data to completely superpose this data on the result of a two-dimensional map display in a floor unit. However, it is further possible to retrieve two-dimensional figure data representing the outer figure of a residence in a relational object HO** level of the apartment. It is also possible to retrieve residence attributes. By checking the attribute data, information relating to a maximum floor of the apartment can be obtained. When a height per floor of the building has been assumed, an absolute height of the building can be obtained. Accordingly, the apartment can be handled to have a three-dimensional data structure for an internal processing, so that a three-dimensional bird's-eye map display as shown in FIG. 15 can be obtained. The three-dimensional display algorithm is used to carry out a perspective conversion processing to obtain a bird's-eye display, as shown in the above reference 2.

Figure 23:
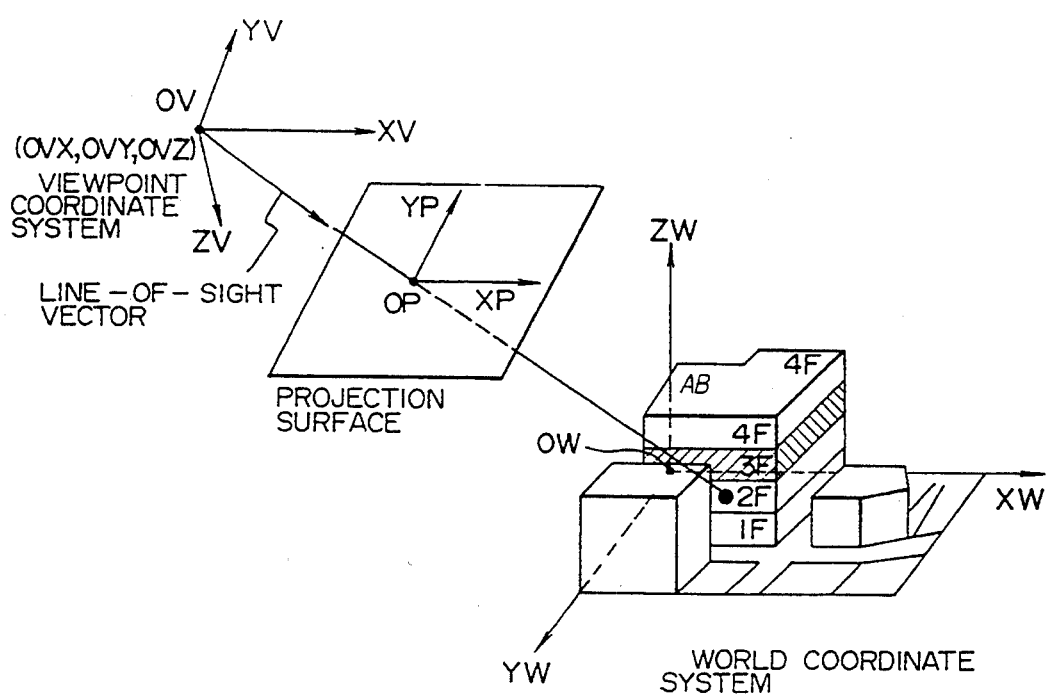
FIG. 23 is a view for explaining coordinate conversion from a world coordinate system to a viewpoint coordinate system.
Figure 24:
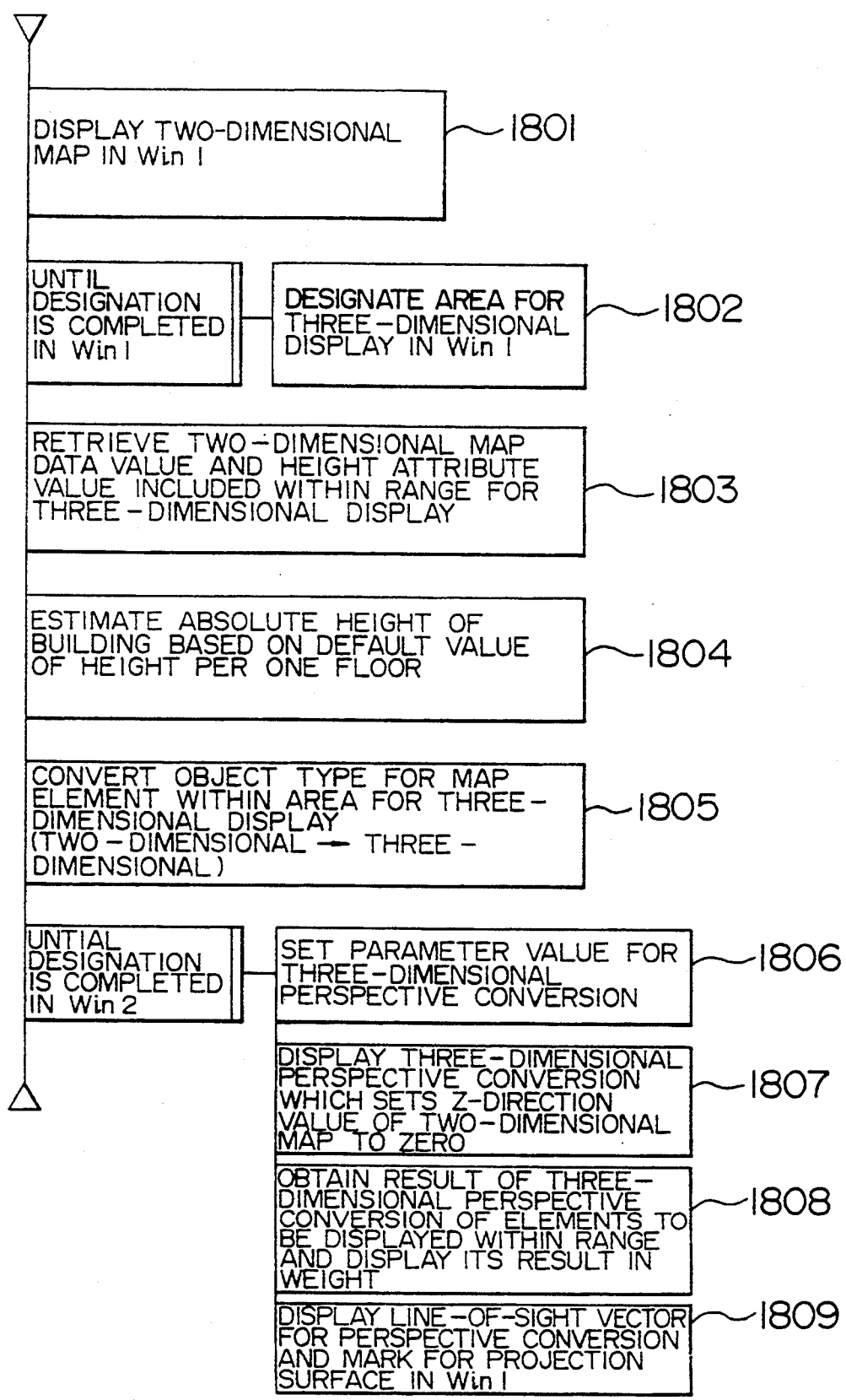
FIG. 24 is a diagram showing a flow of algorithm for the three-dimensional bird's eye display.

FIG. 24 is a flow chart (in a PAD format) for explaining the above-described three-dimensional display procedure. Each process will be explained in the order of the steps of FIG. 24. In step 1801, the whole of map data to be processed is read out from the data base 101 by the section 104, and is two-dimensionally displayed in a window Win1 on the display unit 110 through the sections 114 and 109. This data is the map data itself stored in the map data base 101. In step 1802, an area to be three-dimensionally displayed out of the displayed map data in the window Win1 is designated. The area is designated by the operator through a pointing device such as a mouse operated on the window Win1, and a result of the designation is supplied from the section 100 to the section 111. In step 1803, determination is made whether each polygon vector is included in the designated area based on the figure data of house frames, etc. of figure entity objects stored in the object base 112. Based on the result of the decision, figure entity objects and text entity objects are extracted from the object base 112. For the attributes of the types of buildings and numbers of floors, attribute objects related to the extracted entity objects are referred to by the section 105 and are supplied to the section 114. The section 114 obtains a maximum value of the attribute of the number of floors related to the same type of building. In step 1804, the section 114 refers to the height table 113 and obtains height values of the buildings from the table 113, in which the height data per one floor are stored in advance in accordance with the type of the building. In order to obtain absolute heights of the buildings for the three-dimensional display, maximum numbers of floors of the buildings and the height values obtained up to the step 1803 are respectively multiplied to artificially estimate the absolute heights of the buildings. As described above, more accurately estimated values of the absolute heights can be obtained if average height per one floor to be stored in advance is set for a type of building such as a warehouse, an office building, etc. In step 1805, the section 114 converts a data structure of each display element included within the designated area. The map data to be extracted in the above steps are in the form of two-dimensional entity object as shown in FIG. 14. In the subsequent steps, this data is converted into the format of a three-dimensional entity object as shown in FIG. 15. In the present embodiment, three-dimensional objects of the format of FIG. 15 are prepared by the number of objects extracted, and the corresponding portions are copied directly. The estimated value of the absolute height of each building obtained in the preceding steps is used as a substitution for Z coordinates. On the window Win2 for carrying out the three-dimensional display, elements of the map data for the three-dimensional display are processed perspectively to obtain a bird's-eye three-dimensional coordinate system. In step 1806, parameters which are necessary for the conversion processing are set by the section 100. Details of the three-dimensional perspective conversion are explained with reference to a model having three coordinate systems as shown in FIG. 23.

In FIG. 23, a group of three-dimensional figures to be perspectively converted is described as WC:[XW-YW-ZW] in a world coordinate system. These coordinates are to be converted on a viewpoint coordinate system Vc:[XV-YV-ZV]. As an assumption of FIG. 23, a viewpoint position on the viewpoint coordinate system Vc is at a position of (OVX, OVY, OVZ) in the world coordinate system Wc and a line-of-sight vector for looking at the three-dimensional figure group in the direction cosine (HX, HY, HZ) from this viewpoint is assumed.

Further, the line-of-sight vector intersects at an angle of degrees with a [YV-ZV] plane in the viewpoint coordinate system Vc, and the line-of-sight vector intersects at an angle of $\beta$ degrees with the [YV−ZV] plane. In other words, the direction cosine and sine of $\alpha$ and $\beta$ have the following relation;

$$\cos\alpha = HZ/\sqrt{HX + HZ}$$

$$\sin\alpha = HY/\sqrt{HY + HZ}$$

$$\cos\beta = \sqrt{HY + HZ}\ /\sqrt{HX + HY + HZ}$$

$$\sin\beta = HX/\sqrt{HX + HY + HZ}$$

In this case, in order to carry out the perspective conversion, the following four conversion matrices are obtained and the conversion processings are applied sequentially.

(1) Carry out a parallel displacing conversion TD to match the viewpoint position with the origin of the viewpoint coordinate system VC.
(2) Carry out a coordinate axis rotating conversion RX for rotating around the XV axis by $\alpha$ degrees so that the viewpoint vector is included in the [XV-ZV] plane of the viewpoint coordinate system VC.
(3) Carry out a coordinate axis rotation conversion RY for rotating around the YV axis by $\beta$ degrees so that the ZV axis becomes parallel with the line-of-sight vector.
(4) Carry out a coordinate axis rotating conversion for converting the ZV axis in an opposite direction.

The content of the conversion matrix to be used for each of TD, RX, RY and RZ is as follows $$TD = \begin{bmatrix} 1 & 0 & 0 & 0 \\ 0 & 1 & 0 & 0 \\ 0 & 0 & 1 & 0 \\ -VX & -VY & -VX & 1 \end{bmatrix}$$

$$RX = \begin{bmatrix} 1 & 0 & 0 & 0 \\ 0 & \cos\alpha & -\sin\alpha & 0 \\ 0 & \sin\alpha & \cos\alpha & 0 \\ 0 & 0 & 0 & 1 \end{bmatrix}$$

$$RY = \begin{bmatrix} \cos\beta & 0 & \sin\beta & 0 \\ 0 & 1 & 0 & 0 \\ \sin\beta & 0 & -\cos\beta & 0 \\ 0 & 0 & 0 & 1 \end{bmatrix}$$

$$Z = \begin{bmatrix} 1 & 0 & 0 & 0 \\ 0 & 1 & 0 & 0 \\ 0 & 0 & -1 & 0 \\ 0 & 0 & 0 & 1 \end{bmatrix}$$

Figure 25:
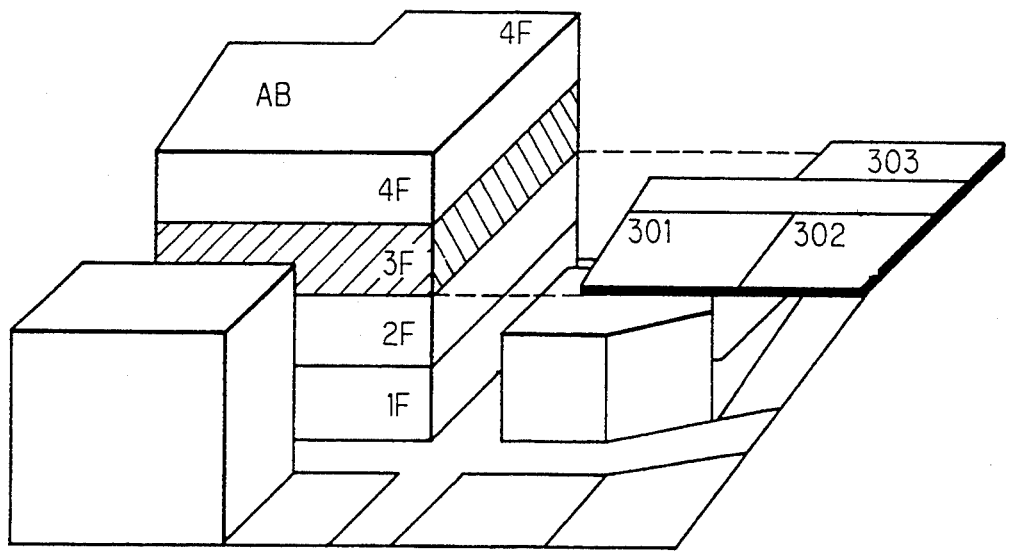
FIG. 25 is a diagram for showing the state a residence map is displayed three-dimensionally and layout data is superposingly displayed on a corresponding floor.

In order to display the layout data on the map of the three-dimensional bird's-eye display by making an identifiable correspondence between these data and the map, a method of display as shown in FIG. 25 can be considered, where the user designates the building and the floor number of the building, and the layout data are displayed to make correspondence on the building frame for which the designated floor has been virtually extracted. To achieve this display, a message GET for retrieving a floor number from the attribute data base is sent to an object PHA** to which the layout data and the attribute data are related, as described above, and the floor number in which the layout data exist is obtained. An absolute height of the building in which the layout data exist is obtained from a virtual value of the height per one floor. By carrying out a three-dimensional perspective conversion in the same manner as that for the map described above, the layout data can be correspondingly displayed on the bird's-eye display of the apartment. In the case of FIG. 25, a display of the layout data is made by deviating the coordinate axis to a lateral direction (for example, the XW axis direction) from the corresponding position of the apartment, so that the layout display is not interfered with by the residence frame for indicating the apartment. A display of the layout data by deviating the coordinate axis to a vertical direction (for example, the YW axis direction) can also be considered. The flow of the processings for making a display of the layout data on the three-dimensional bird's-eye display of the map is almost the same as that shown in FIG. 21, except for Steps 1207 and 1208, and the layout data is displayed by completely superposing the data on the building frame in FIG. 21. In other words, in the case of a three-dimensional bird's-eye display, the building frame to be prepared virtually is in the perspective coordinate system, so that a perspective conversion processing needs to be applied to the simple coordinate conversion processing which is based on a rotation and a size conversion, to completely superpose the layout data on a rectangle which is taken out virtually in a floor unit. Further, the processing for taking out a virtual crossing surface by floor of the building frame can be achieved by fixing the Z axis in each floor height to prepare a two-dimensional figure of (x, y) and by drawing again the reference position of the figure around the coordinate position indicated by the user with a mouse or the like.

Figure 27:
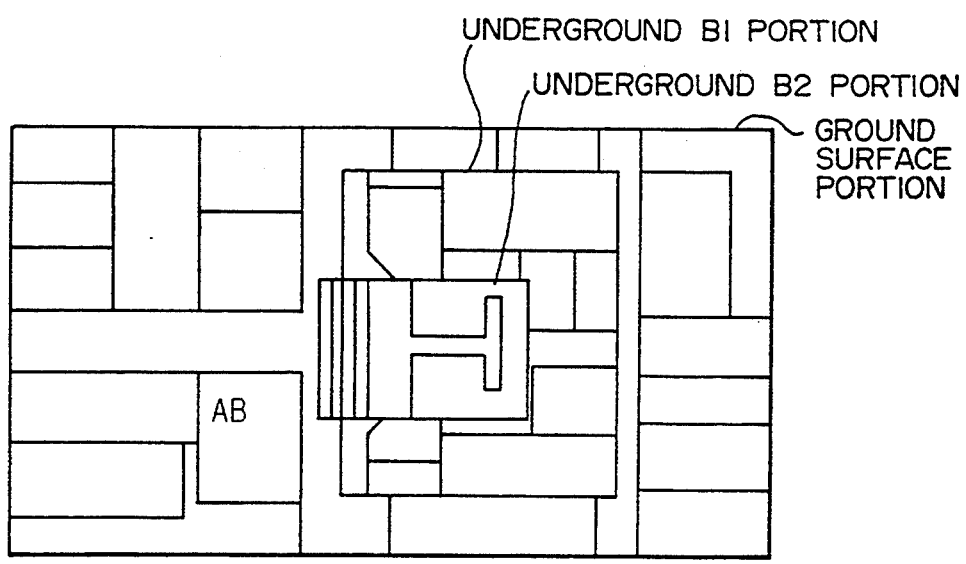
FIG. 27 is a diagram for showing the state of retrieving the layout data relating to the underground shop street and subway station diagrams shown in FIGS. 26A to 26C, by relating to a map display on the ground surface.
Figure 26A:
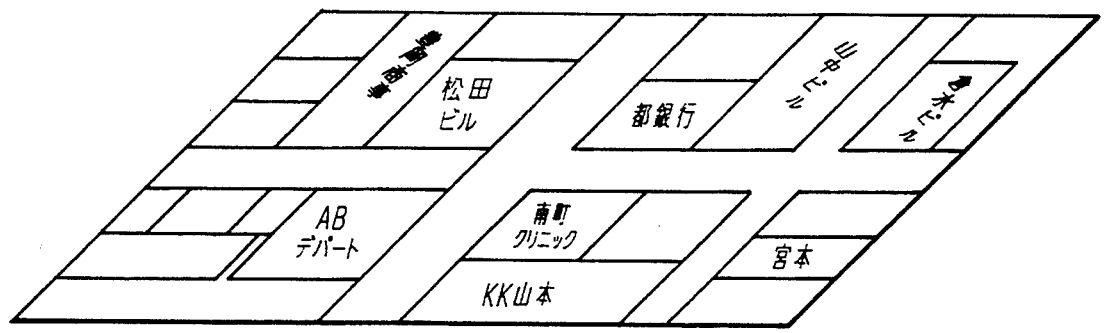
FIGS. 26A, 26B and 26C are diagrams for showing the relationship between layout data and a map when the layout data is for a wide underground shop street layout diagram and a subway station diagram of a wide area.
Figure 26B:
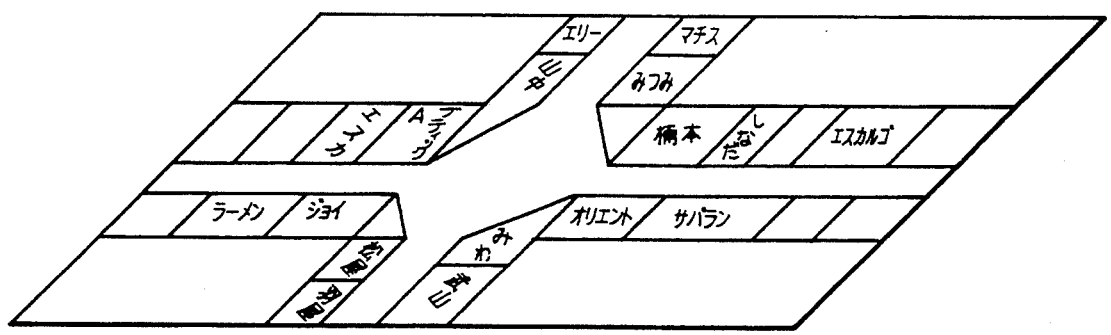
Figure 26C:
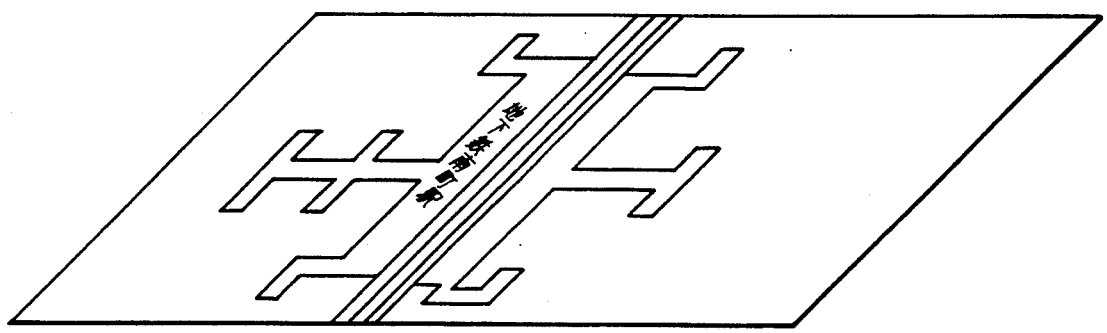
Figure 28:
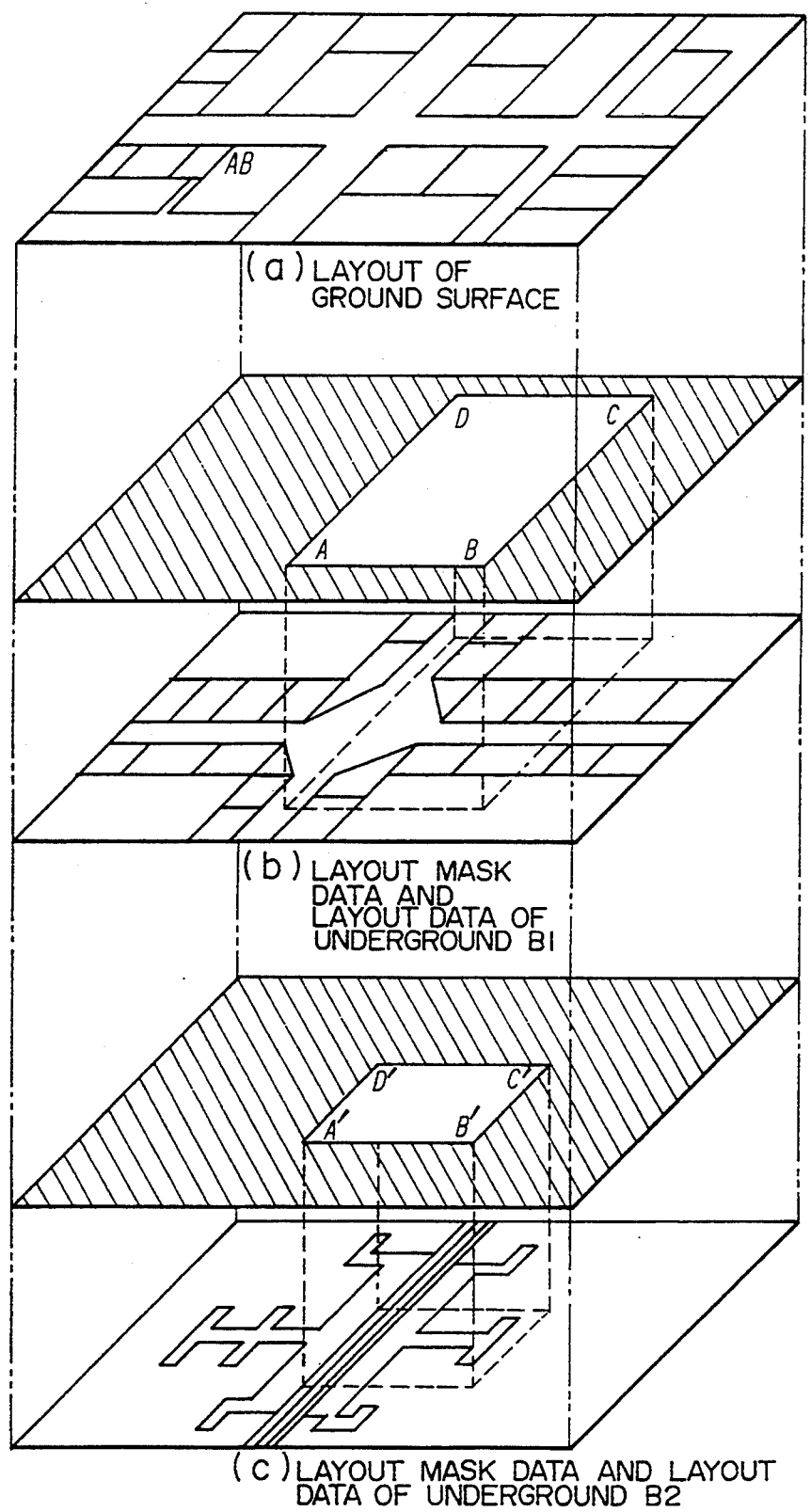
FIG. 28 is a principle diagram for making a correspondence with a mask shape to realize a retrieval of the underground layout data shown in FIG. 27.
Figure 29:
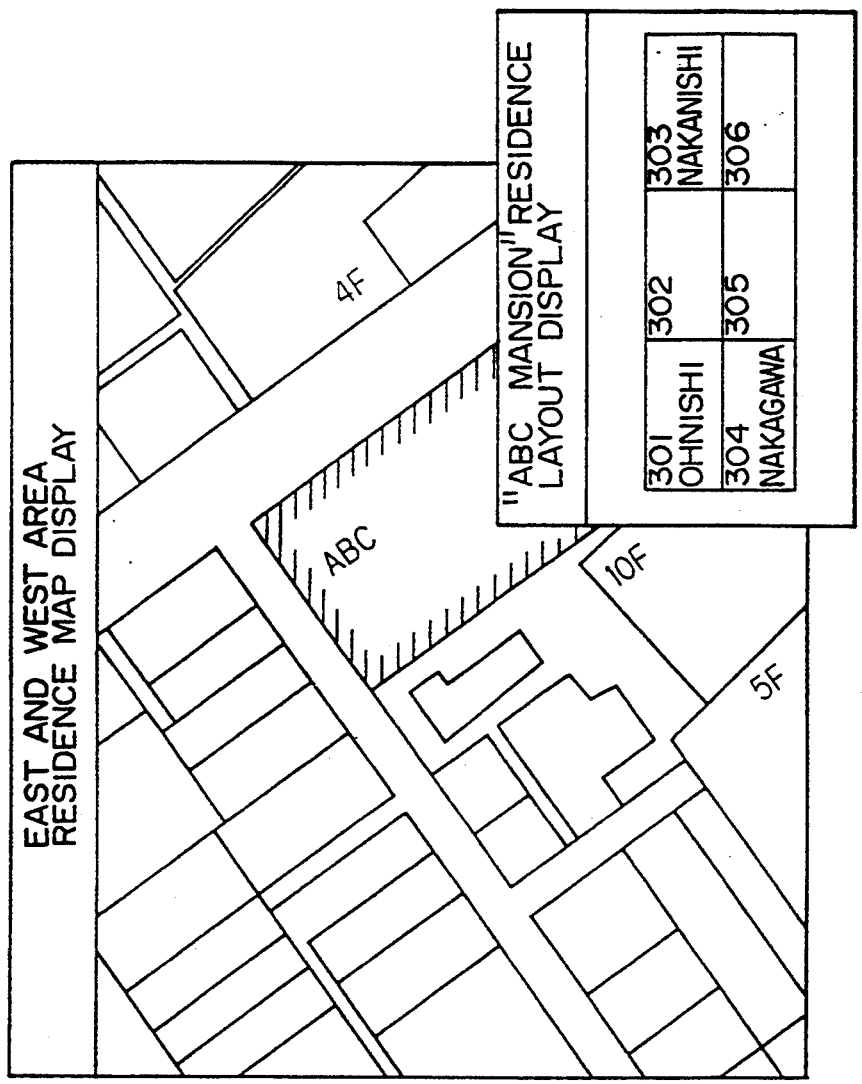
FIG. 29 is a diagram for showing an example of displaying layout data on a separate window by retrieving the layout data by designating a building according to a conventional method.

When the layout data is for a wide region such as a shop layout diagram of the underground street as shown in FIGS. 26A, 26B and 26C, it is not possible to have a complete superposing relation between the layout data and only a certain building. In this case, it is necessary to have a superposing relation over the whole region of the displayed screen, and it is meaningless to replace a superposing portion as shown in FIGS. 20A to 20C. It is also inconvenient to make a three-dimensional bird's-eye display of the layout data for each floor in the same manner as shown in FIG. 31 because the display of the map on the ground may interfere with the display of the layout. To avoid this problem, as shown in FIG. 27, the map data of the ground portion for the whole region is displayed on the screen of the display unit 110. When it is desired to look at the state of the underground in a three-dimensional display, the area of the corresponding portion is designated with a pointing device such as a mouse or the like, and layout data which correspond to the position and the area are extracted and displayed superposingly, so that the layout of only the required portion can be displayed. The attribute data having three-dimensional characteristics are retrieved from the attribute data base 102 and are displayed at the corresponding position of the layout data which have been obtained above. FIG. 27 shows the map of the ground surface portion on the whole screen and also shows the areas showing two underground states of an underground B1 portion and an underground B2 portion. In the case of the display method shown in FIG. 27, the state of a certain underground floor can be displayed as if a superposed sheet is removed, only when a position and an area to be retrieved three-dimensionally have been designated. Therefore, this is slightly different from the concept of a simple window which has been practically used in the work station or the like. In other words, in the case of the window, the content being displayed can be disposed at any position within the screen without changing the content of the screen, independent of the display position of the window. However, in the case of the present embodiment, the bottom state of the position corresponding to the designated area is displayed in synchronism with the move of the layout of the designated area. The display as shown in FIG. 27 can be made in the same method as explained in the flow of the processing above, except for a partial different. In other words, in the retrieving section 106, the layout data is expanded so as to completely superpose on the map displayed, and only the designated area is extracted from the display unit 110. This processing, the so-called "clipping processing", may be in the same method as shown in the reference 2, for example. This clipping processing can be achieved by the basic processing in the general computer graphics. In other words, as shown in FIG. 28, a mask for clipping in a floor unit is provided and an AND figure to the layout data in each floor and the corresponding mask for clipping is prepared, and the AND figure is transferred to within the square which is equivalent to the clipping mask on the map of the ground surface and then is displayed. For example, in the case of preparing an AND figure between the layout data of the underground B1 and ABCD mask data shown in FIG. 28, the inside of the square ABCD is set at a value of 1 and the outside shown by shaded lines is set at a value of zero and a logical product calculation is carried out. Then, the underground B1 figure only inside the square ABCD is obtained. A square of a background color having the same dimensions and the same position as those of the inside of the mask data is displayed on the map of the ground surface, and the logical product layout data of the underground B1 are displayed on this square, thus preparing the AND figure. Further, when the above processing are repeated for the underground B2, the layout corresponding to the underground B2 can be superposingly displayed on the underground B1 as shown in FIG. 27.

Three methods have been shown above for the display of layout data. In the above description, vector data given by the coordinate column as the figure portion in FIG. 11A have been assumed and the text data given by the character code string as the text portion in FIG. 11B have been assumed in the map data base 101 and the layout data base 103 respectively. However, in general, individual private information is included, in many cases, in the layout information within a building. Accordingly, the layout information exists in many cases, as simple image information having no vector or text as a public data base. Even in this case, the above-described method for superposingly displaying the layout data on the map basically remains unchanged. However, the object for carrying out coordinate conversion and affine transformation for completely superposing the layout data on the residence frame on the map changes merely from the coordinate and text data to the image data. Actual conversion processing changes merely from the coordinate point of (x, y) to a pixel unit of an image. Map information in a certain area may not be digitalized as is done in the center of the town. In this case, the map information is displayed as an image on the display unit 110 and building information is converted from a building image into vector data by the method as shown in the reference 4, to make it possible to make an individual access of the buildings. By using these data as a retrieval key, the layout information can be retrieved in exactly the same manner as the above-described method.

What is claimed is:

1. A method of displaying a layout of divisions of floors of a building in a map information system, comprising the steps of:

providing map data including two-dimensional map data with respect to one or more buildings, and two-dimensional map data with respect to at least two floors for at least one of said buildings, division data representing divisions of each floor of each building and attribute data representing three-dimensional characteristics for each building;

displaying a map in a first window of a display unit in response to a map display instruction based on said map data;

designating a particular building and a floor to generate a first layout display instruction; and displaying a layout of divisions of the designated building at the designated floor and attributes associated therewith in a second window of the screen, in response to the first layout display instruction based on the division data and the attribute data.

2. A method according to claim 1, wherein said providing map data step includes the steps of:

providing a division entity object and an attribute entity object for division data and attribute data in correspondence to each division and each attribute, respectively, the division entity object including division data for the division and a procedure for representing a division based on the division data, and the attribute entity object including attribute data for an attribute and a procedure for drawing the attribute based on the attribute data; and providing lower relation objects each of which relates a division entity object to a corresponding attribute entity object and an upper relation object which relates lower relation objects for each floor of the particular building; and wherein said steps of displaying a layout includes the steps of:

issuing the first layout display instruction to the upper relation object;

issuing messages from the upper relation object to the lower relation objects; and executing the procedures of the division entity object and the attribute entity object for each division.

3. A method according to claim 2, wherein said providing map data step further includes the step of providing a building entity object for each building and a map relation object related to the building entity objects, each building entity object including map data for the building and a procedure for drawing the building based on the map data; and wherein said step of displaying a map includes the steps of:

issuing a map display instruction to a map relation object; and executing procedures of the building entity objects in accordance with a message from the map relation object.

4. A method according to claim 2, further comprising the steps of:

designating another floor of the designated building to generate a second layout display instruction; and displaying another layout of divisions of the designated building at the designated other floor and attributes associated therewith in a third window in response to the second layout display instruction based on the division data and the attribute data.

5. A method according to claim 1, wherein the second window is overlapped in the same area as that in which the particular building is displayed; and wherein said designating step further includes the step of detecting from the map data the area in which to set the second window; and wherein said step of displaying a layout includes the step of overlapping displaying the layout of the divisions and the attributes on the display of the particular building.

6. A method according to claim 5, wherein sizes of said divisions of the displayed layout data are equal to each other.

7. A method according to claim 5, wherein the attribute data includes size data representing a size of each division; and wherein said step of displaying a layout includes the step of displaying a layout of divisions based on size data.

8. A method according to claim 1, wherein said step of displaying a map includes the steps of:

converting the two-dimensional map into a three-dimensional map from an oblique view point in response to the map display instruction based on the map data and height data for each building, the attribute data including the height data; and displaying the converted three-dimensional map in the first window; and wherein said step of displaying a layout includes the steps of converting, in response to the first layout display instruction, the layout of divisions in accordance with the oblique view point; and displaying the converted layout in the second window which is provided at an adjacent area to the particular building with the same height as the designated floor.

9. A map information system for displaying a layout of divisions of floors of a building on a map, comprising:

a map data base for storing map data including a map with respect to figures of one or more buildings and maps with respect to at least two floors for at least one of said buildings.;

a layout data base for storing layout data representing a layout of divisions of said at least one of said buildings at each floor;

display means for displaying data inputted thereto; and display control means for retrieving map data from the map data base to output the map data to said display means for display of a map in a first window on said display means, in response to a map display instruction, and retrieving from said layout data base layout data for a particular floor of a particular building in response to a layout display instruction to output the retrieved layout data to said display means for display of the layout of divisions in a second window, the layout display instruction including at least information of a particular floor of a particular building.

10. A map information system according to claim 9, wherein said layout data base stores layout data as division entity objects each of which includes division data representing a division of a floor of a building and a procedure for outputting the division data to said display means in response to draw message, said map information system further comprising:

an object base for storing layout relational objects each of which relates division entity objects for a floor of a building and generates a draw message in response to the layout display instruction, and wherein said display control means includes means for issuing the layout display instruction to a layout relational object associated with a particular floor of a particular building and transferring the draw message to a relational object.

11. A map information system according to claim 9, wherein said display control means includes means for overlapping the second window on an area in said first window.

12. A map information system according to claim 11, wherein said display control means includes means for outputting the layout data to said display means such that sizes of the displayed divisions are equal to each other.

13. A map information system according to claim 11, wherein said display control means further comprises:

means for retrieving from said layout data base layout data for another particular floor of the particular building in response to a layout display updating instruction to output the same layout data to said display means for display of the same layout data in a third window, the layout display updating instruction including at least information of the other particular floor of the particular building.

14. A map information system according to claim 13, wherein the layout data includes data representing sizes of division and said display control means includes means for outputting layout data to said display means such that a layout of divisions is displayed in the second window with the sizes based on size data.

15. A map information system according to claim 9, wherein said layout data base stores layout data as division entity objects each of which includes division data representing a division of a floor of a building and a procedure for outputting division data to said display means in response to a draw message;

said map information system further comprising:

an attribute data base for storing attribute entity objects each of which includes attribute data representing an attribute for each division of each floor of each building; and an object base for storing layout relational objects each of which relates division entity objects and attribute entity objects for a floor of a building and generates a draw message in response to a layout display instruction, and wherein said display control means includes means for issuing a layout display instruction to a layout relational object associated with a particular floor of a particular building and transferring the draw message to division entity objects and attribute entity objects associated with the layout relational object.

16. A method of displaying a layout of divisions of floors of a building in a map information system, comprising the steps of:

providing map data including two-dimensional map data with respect to one or more buildings, and two-dimensional map data with respect to at least two floors for at least one of said buildings, division data representing divisions of each floor of each building and attribute data representing three-dimensional characteristics for each building;

displaying a map in a first window of a display unit in response to a map display instruction based on said map data;

designating a particular building and a floor to generate a first layout display instruction; and displaying a layout of divisions of the designated building at the designated floor and attributes associated therewith in a second window of the screen, in response to the first layout display instruction based on the division data and the attribute data wherein the second window overlaps the same area as that in which the particular building is displayed such that a layout includes an overlapping display of the divisions and the attributes on the display of the particular building.

17. A map information system for displaying a layout of divisions of a floor of a building on a map, comprising:

a map data base for storing map data including a map with respect to figures of one or more buildings and maps with respect to at least two floors for at least one of said buildings;

a layout data base for storing layout data representing a layout of divisions of said at least one of said buildings at each floor;

display means for displaying data inputted thereto; and display control means for retrieving map data from the map data base to output the map data to said display means for display of a map in a first window on said display means, in response to a map display instruction, and retrieving from said layout data base layout data for a particular floor of a particular building in response to a layout display instruction to output the retrieved layout data to said display means for display of the layout of divisions in a second window, the layout display instruction including at least information of a particular floor of a particular building wherein said display control means includes means for overlapping the second window on an area in said first window.

* * * * *